(12) United States Patent
Tawara et al.

(10) Patent No.: US 11,590,652 B2
(45) Date of Patent: Feb. 28, 2023

(54) MEASURING DEVICE

(71) Applicant: Keyence Corporation, Osaka (JP)

(72) Inventors: Kyosuke Tawara, Osaka (JP); Naoki Takayama, Osaka (JP)

(73) Assignee: KEYENCE CORPORATION, Osaka (JP)

(*) Notice: Subject to any disclaimer, the term of this patent is extended or adjusted under 35 U.S.C. 154(b) by 176 days.

(21) Appl. No.: 17/094,839

(22) Filed: Nov. 11, 2020

(65) Prior Publication Data

US 2021/0178584 A1 Jun. 17, 2021

(30) Foreign Application Priority Data

Dec. 12, 2019 (JP) .............................. JP2019-224154

(51) Int. Cl.
*B25J 9/16* (2006.01)
*B25J 13/08* (2006.01)
*G01B 11/24* (2006.01)
*G01B 11/00* (2006.01)

(52) U.S. Cl.
CPC ............ *B25J 9/1664* (2013.01); *B25J 9/1612* (2013.01); *B25J 9/1661* (2013.01); *B25J 9/1697* (2013.01); *B25J 13/08* (2013.01); *G01B 11/005* (2013.01); *G01B 11/24* (2013.01)

(58) Field of Classification Search
CPC ...... B25J 9/1664; B25J 9/1612; B25J 9/1661; B25J 9/1697; B25J 13/08; B25J 11/00; B25J 9/1671; G01B 11/005; G01B 11/24; G01B 11/2527; G01B 11/2545; G05B 19/0426; G05B 2219/37555; G05B 2219/40607
See application file for complete search history.

(56) References Cited

U.S. PATENT DOCUMENTS 9,844,877 B1* 12/2017 Jules ...................... B25J 9/1664
2019/0039237 A1* 2/2019 Nakashima ............ B25J 9/1669
2021/0023711 A1* 1/2021 Lee .......................... B25J 9/163

FOREIGN PATENT DOCUMENTS

JP 2018144159 A 9/2018

OTHER PUBLICATIONS

U.S. Appl. No. 17/346,311, filed Jun. 14, 2021 (139 pages).

* cited by examiner

*Primary Examiner* — Nicholas Kiswanto
*Assistant Examiner* — Dylan Brandon Mooney
(74) *Attorney, Agent, or Firm* — Kilyk & Bowersox, P.L.L.C.

(57) ABSTRACT

A user can easily create a robot program. A measuring device includes a position determination processing part that determines a holding position, held by a robot hand, of a workpiece placed in a work space and determines coordinates of a fixed via point having any single attribute based on a result of measurement made by a measuring part and holding information, the fixed via point being one of an approach position of the robot hand for holding the holding position, the holding position, and a retreat position after holding, and an output part that outputs, to a robot controller, the coordinates of the fixed via point determined by the position determination processing part and attribute information showing the attribute of the fixed via point.

16 Claims, 24 Drawing Sheets

FIG. 15A

EXAMPLE OF MAIN PROGRAM

```
1   ISSUE TRIGGER TO CAMERA
2   IF NO MEASUREMENT RESULT
3       TERMINATE PROGRAM
4   ENDIF
5
6   RECEIVE RESULT OF PATH CREATION
7
8   FOR NUMBER OF FIXED VIA POINTS

9       FOR NUMBER OF INTERMEDIATE VIA POINTS BETWEEN FIXED VIA POINTS
10              ISSUE Move COMMAND TO ROBOT
11      ENDFOR
12      DETERMINE ATTRIBUTE OF CURRENT FIXED VIA POINT
13      ISSUE ACTION IN ACCORDANCE WITH ATTRIBUTE (CALL ANOTHER PROGRAM)

14  ENDFOR
15
```

FIG. 15B

EXAMPLE OF ACTION PROGRAM: Action Grasp

```
1   Hand open
2
```

FIG. 16

EXAMPLE OF MAIN PROGRAM

```
1    ISSUE TRIGGER TO CAMERA
2    IF NO MEASUREMENT RESULT
3            TERMINATE PROGRAM
4    ENDIF
5
6    RECEIVE RESULT OF PATH CREATION
7
8    FOR NUMBER OF VIA POINTS BETWEEN FIXED VIA POINT 0 AND FIXED VIA POINT 1
9            ISSUE Move COMMAND TO ROBOT
10   ENDFOR
11   ISSUE ACTION AT FIXED VIA POINT 1 (HOLDING POSITION)
     FOR EXAMPLE, HAND_OPEN
12
13   FOR NUMBER OF VIA POINTS BETWEEN FIXED VIA POINT 1 AND FIXED VIA POINT 2
14           ISSUE Move COMMAND TO ROBOT
15   ENDFOR
16   ISSUE ACTION AT FIXED VIA POINT 2
17
18   FOR NUMBER OF VIA POINTS BETWEEN FIXED VIA POINT 2 AND FIXED VIA POINT 3
19           ISSUE Move COMMAND TO ROBOT
20   ENDFOR
21   ISSUE ACTION AT FIXED VIA POINT 3
22
23   FOR NUMBER OF VIA POINTS BETWEEN FIXED VIA POINT 3 AND FIXED VIA POINT 4
24           ISSUE Move COMMAND TO ROBOT
25   ENDFOR
26   ISSUE ACTION AT FIXED VIA POINT 4
27
28   FOR NUMBER OF VIA POINTS BETWEEN FIXED VIA POINT 4 AND FIXED VIA POINT 5
29           ISSUE Move COMMAND TO ROBOT
30   ENDFOR
31   ISSUE ACTION AT FIXED VIA POINT 5
32
```

FIG. 18

```
EXAMPLE OF MAIN PROGRAM
 1    ISSUE TRIGGER TO CAMERA
 2    IF NO MEASUREMENT RESULT
 3            TERMINATE PROGRAM
 4    ENDIF
 5
 6    RECEIVE RESULT OF PATH CREATION
 7
 8    FOR NUMBER OF VIA POINTS BETWEEN FIXED VIA POINT 0 AND FIXED VIA POINT 1
 9            ISSUE Move COMMAND TO ROBOT
10    ENDFOR
11    ISSUE ACTION AT FIXED VIA POINT 1 (HOLDING POSITION)
      DELETE HAND_OPEN FROM HERE 12
13    FOR NUMBER OF VIA POINTS BETWEEN FIXED VIA POINT 1 AND FIXED VIA POINT 2
14            ISSUE Move COMMAND TO ROBOT
15    ENDFOR
16    ISSUE ACTION AT FIXED VIA POINT 2
      WRITE HAND_OPEN HERE
17
18    FOR NUMBER OF VIA POINTS BETWEEN FIXED VIA POINT 2 AND FIXED VIA POINT 3
19            ISSUE Move COMMAND TO ROBOT
20    ENDFOR
21    ISSUE ACTION AT FIXED VIA POINT 3
22
23    FOR NUMBER OF VIA POINTS BETWEEN FIXED VIA POINT 3 AND FIXED VIA POINT 4
24            ISSUE Move COMMAND TO ROBOT
25    ENDFOR
26    ISSUE ACTION AT FIXED VIA POINT 4
27
28    FOR NUMBER OF VIA POINTS BETWEEN FIXED VIA POINT 4 AND FIXED VIA POINT 5
29            ISSUE Move COMMAND TO ROBOT
30    ENDFOR
31    ISSUE ACTION AT FIXED VIA POINT 5
32
33    FOR NUMBER OF VIA POINTS BETWEEN FIXED VIA POINT 5 AND FIXED VIA POINT 6
      INCREASE FREQUENCY OF PROCESS BY NUMBER OF VIA POINTS ADDED
34            ISSUE Move COMMAND TO ROBOT
35    ENDFOR
36    ISSUE ACTION AT FIXED VIA POINT 6
```

FIG. 19

| ATTRIBUTE INFORMATION ARRAY | 0 | 1 | 2 | 3 | 4 | 5 | 6 | 7 | 8 |
|---|---|---|---|---|---|---|---|---|---|
| | DESIGNATED POSITION | DESIGNATED POSITION | APPROACH POSITION | HOLDING POSITION | RETREAT POSITION | DESIGNATED POSITION | DESIGNATED POSITION | PLACE POSITION | DESIGNATED POSITION |
| VIA POINT ARRAY | POSITION INFORMATION | POSITION INFORMATION | POSITION INFORMATION | POSITION INFORMATION | POSITION INFORMATION | POSITION INFORMATION | POSITION INFORMATION | POSITION INFORMATION | POSITION INFORMATION |

FIG. 20

| | 0 | 1 | 2 | 3 | 4 | 5 |
|---|---|---|---|---|---|---|
| COMMAND ARRAY | VIA POINT | VIA POINT | VIA POINT | HAND | VIA POINT | HAND |
| VIA POINT ARRAY | POSITION INFORMATION | POSITION INFORMATION | POSITION INFORMATION | POSITION INFORMATION | POSITION INFORMATION | POSITION INFORMATION |

| 7 | 8 | 9 | 10 | 11 | 12 |
|---|---|---|---|---|---|
| HAND | VIA POINT | VIA POINT | VIA POINT | HAND | VIA POINT |
| POSITION INFORMATION | POSITION INFORMATION | | | | |

VIA POINT … REQUEST TO TRACE VIA POINT

HAND … REQUEST TO OPEN HAND AND CLOSE HAND

FIG. 21

EXAMPLE OF MAIN PROGRAM
```
1    ISSUE TRIGGER TO CAMERA
2    IF NO MEASUREMENT RESULT
3        TERMINATE PROGRAM
4    ENDIF
5
6    RECEIVE RESULT OF PATH CREATION
7
8    FOR LENGTH OF COMMAND ARRAY
9            SWITCH EACH ELEMENT OF COMMAND ARRAY
10                   CASE VIA POINT MOVEMENT COMMAND
11                           ISSUE Move COMMAND TO ROBOT 12                   CASE HAND OPERATION COMMAND
13                           ISSUE HAND ACTION
14           END SWITCH
15   ENDFOR
```

FIG. 22

| COMMAND ARRAY | 0 | 1 | 2 | 3 | 4 | 5 | 6 |
|---|---|---|---|---|---|---|---|
| | VIA POINT | POSITION INFORMATION | VIA POINT | POSITION INFORMATION | VIA POINT | POSITION INFORMATION | HAND |

| 7 | 8 | 9 | 10 | 11 | 12 | 13 |
|---|---|---|---|---|---|---|
| NA | VIA POINT | POSITION INFORMATION | HAND | NA | VIA POINT | POSITION INFORMATION |

| 14 | 15 | 16 | 17 | 18 | 19 |
|---|---|---|---|---|---|
| VIA POINT | POSITION INFORMATION | VIA POINT | POSITION INFORMATION | VIA POINT | POSITION INFORMATION |

MEASURING DEVICE

CROSS-REFERENCE TO RELATED APPLICATIONS

The present application claims foreign priority based on Japanese Patent Application No. 2019-224154, filed Dec. 12, 2019, the contents of which are incorporated herein by reference.

BACKGROUND OF THE INVENTION

1. Field of the Invention

The present invention relates to a measuring device capable of measuring a workpiece placed in a work space and controlling a robot that conveys the workpiece.

2. Description of Related Art

In the related art, a three-dimensional measuring device is known, for example, as disclosed in JP 2018-144159 A, the three-dimensional measuring device being configured to make motion settings of a robot so as to measure a three-dimensional shape of a workpiece placed in a work space, control a robot hand of the robot to hold the workpiece, and place the workpiece held by the robot hand at a placing position.

The three-dimensional measuring device disclosed in JP 2018-144159 A is provided separately from a robot controller, and is capable of making a high-precision three-dimensional measurement that is difficult for the robot controller, and outputting, to the robot controller, points through which the robot hand needs to pass such as an approach position where the robot hand holds the workpiece and a holding position held by the robot hand so as to enable various functions based on a result of the measurement.

That is, the three-dimensional measuring device acquires three-dimensional data that results from capturing an image of the workpiece and an area around the workpiece by, for example, an imaging part, and then searches the three-dimensional data thus acquired for the workpiece to determine a holding orientation and the like. Then, coordinates of the holding position where the workpiece is held are calculated, and the coordinates thus calculated are output to the robot controller.

Upon receipt of the coordinates, the robot controller controls the robot hand to cause the robot hand to hold the workpiece, convey the workpiece to a predetermined placing position, and place the workpiece at the place position.

Such a three-dimensional measuring device in the related art is capable of outputting, to the robot controller, the points (via points) through which the robot hand needs to pass, but it is required that a user program a motion path of the robot hand between the via points. For example, assuming that the workpiece is stored in a box, the box may become an obstacle while the robot hand is in motion, so that it is necessary to make the program to avoid the box, which makes the program complicated and in turn requires more time and effort.

Possible approaches include a method in which the three-dimensional measuring device automatically calculates not only the via points but also the motion path between the via points, and outputs fixed points such as the holding position set by the user, that is, fixed via points, and intermediate via points. This method eliminates the need for the user to program the motion path between the via points.

However, in this case, the number of via points through which the robot needs to pass is not determined unless the motion path is actually created, which prevents the robot controller from identifying via points where the robot hand needs to perform a holding motion or placing motion and in turn prevents the user from creating the robot program in a simplified manner.

Further, when the user increases or decreases the number of fixed via points, the number of via points output by the three-dimensional measuring device and the number of via points expected by a robot controller-side program become different from each other unless reprogramming is made on the robot controller side. Therefore, each time the user increases or decreases the number of fixed via points, it takes time and effort to make reprogramming.

Further, each fixed via point has a unique attribute such as "point where a holding motion needs to be performed" or "point where a placing motion needs to be performed". For example, when a via point is changed on the three-dimensional measuring device side, unless the robot controller side follows the attribute of the via point thus changed, the holding motion or the placing motion may be performed at an unexpected position, which also makes the program creation difficult.

SUMMARY OF THE INVENTION

The present invention has been made in view of such circumstances, and it is an object of the present invention to allow a user to create a robot program in a simplified manner.

In order to achieve the above object, a measuring device according to an aspect of the present invention that measures a workpiece placed in a work space and controls a robot that conveys the workpiece includes a measuring part that measures a position and orientation of the workpiece placed in the work space, a holding information storage part that stores holding information showing a possible holding position of the workpiece held by a robot hand of the robot, a position determination processing part that determines a holding position, held by the robot hand, of the workpiece placed in the work space and determines coordinates of a fixed via point having any single attribute based on a result of measurement made by the measuring part and the holding information stored in the holding information storage part, the fixed via point being one of an approach position of the robot hand for holding the holding position, the holding position, and a retreat position after holding, and an output part that outputs, to a robot controller connected to the robot, the coordinates of the fixed via point determined by the position determination processing part and attribute information showing the attribute of the fixed via point.

According to this structure, when the position and orientation of the workpiece placed in the work space is measured by the measuring part, the holding position of the workpiece held by the robot hand is determined based on a result of the measurement and prestored holding information showing the possible holding position of the workpiece. Further, the coordinates of the fixed via point having any single attribute among the approach position of the robot hand for holding the holding position thus determined, the holding position, and the retreat position after holding are also determined. Since the coordinates of the fixed via point and the attribute information showing the attribute of the fixed via point are output to the robot controller, the user only needs to edit path settings of the robot hand without consideration of a correspondence relation with the robot controller side and to verify the motion of the robot hand without concern for the motion of the robot itself. In other words, the user can create the robot program simply by describing the motion of the robot hand in accordance with each attribute information.

The coordinates of the fixed via point and the attribute information showing the attributes of the fixed via point only need to have a correspondence relation, and the coordinates of the fixed via point and the attribute information may be brought together into one butch and then output, or alternatively, may be output separately. The former mode includes a mode where, for example, a fixed via point (start point), a fixed via point (approach position), and a fixed via point (holding position) are output in this order. The latter mode includes a mode where a first fixed via point, a robot hand release command (attribute information), a second fixed via point, and a robot hand holding command (attribute information) are output in this order. Even in a mode where the coordinates of the fixed via point and the attribute information are separately output at different timings, the first fixed via point and the robot hand release command have a correspondence relation.

The coordinates of the fixed via point and the attribute information showing the attribute of the fixed via point may be managed in the same table or in different tables. In any case, the order and number of the coordinates of the fixed via point and the attribute information showing the attribute of the fixed via point are the same and have a correspondence relation.

Further, the measuring part may be a two-dimensional measuring part capable of making a two-dimensional measurement in an X direction and Y direction, or a three-dimensional measuring part capable of making a three-dimensional measurement in a Z direction (height direction) in addition to the X direction and Y direction.

It is preferable that a user interface creation part that creates a user interface that shows, when a plurality of the fixed via points are determined by the position determination processing part, a passing order of the plurality of fixed via points and allows individual editing of the plurality of fixed via points and a display part that displays the user interface created by the user interface creation part may be provided.

This structure allows the user to grasp the passing order of the plurality of fixed via points on the user interface and thus easily visualize the motion of the robot hand. Furthermore, since each fixed via point can be edited, the user can easily change the program.

It is preferable that an input part that receives a fixed via point added on the user interface and receives attribute information showing an attribute of the fixed via point thus added may be provided, and the output part may be configured to output, to the robot controller, the fixed via point and the attribute information received by the input part.

This structure allows the user to add a fixed via point and input, when the fixed via point is added, the attribute information on the fixed via point. The added fixed via point and the attribute information are output to the robot controller, and a robot program that reflects the added fixed via point is created.

It is preferable that the input part may be capable of adding a designated position designated by the user as a fixed via point.

This structure allows the user to add any designated position so as to avoid an obstacle, for example. Accordingly, the robot hand can be moved by a simple operation made by the user so as not to interfere with an obstacle or the like.

It is preferable that the input part may be capable of adding a place position of the workpiece as a fixed via point.

This structure allows the user to add the place position (placing position) of the workpiece as desired and create a program so as to place the workpiece at the place position thus added.

It is preferable that the output part may be configured to output, to the robot controller, the number of the fixed via points determined by the position determination processing part, the number of intermediate via points between the fixed via points when a plurality of the fixed via points are determined by the position determination processing part, coordinates of each of the fixed via points, and coordinates of each of the intermediate via points.

This structure allows the number of fixed via points, the number of intermediate via points, the coordinates of each of the fixed via points, and the coordinates of each of the intermediate via point to be output to the robot controller, which allows the robot controller side to create a program based on these pieces of information.

It is preferable that a fixed via point having attribute information on the holding position be allowed to be associated with special motion information that causes the robot hand to perform a special motion other than conveyance to a place position, and the output part may be configured to output the special motion information to the robot controller when outputting coordinates of the fixed via point associated with the special motion information.

That is, for example, in a case where the workpiece is stored in a box and located near a wall surface, it may be difficult to hold the possible holding position of the workpiece. Such a case may require a special motion where, in a state where the workpiece cannot be conveyed to the place position as it is, the workpiece is moved to and placed at a position where the possible holding position can be held. Examples of the special motion include a motion for pulling a workpiece, a motion for lifting a workpiece, and the like. This structure causes, when the coordinates of the fixed via point associated with the special motion information, the special motion information to be output to the robot controller, thereby allowing the robot hand to perform, in a simplified manner, the special motion as described above.

Further, a measuring device that measures a workpiece placed in a work space and controls a robot that conveys the workpiece, the measuring device may include a measuring part that measures a position and orientation of the workpiece placed in the work space, a holding information storage part that stores holding information showing a possible holding position of the workpiece held by a robot hand of the robot, a position determination processing part that determines a holding position, held by the robot hand, of the workpiece placed in the work space and determines coordinates of a fixed via point having any single attribute based on a result of measurement made by the measuring part and the holding information stored in the holding information storage part, the fixed via point being one of an approach position of the robot hand for holding the holding position, the holding position, and a retreat position after holding, and processes the attribute information showing the attribute of the fixed via point to convert the attribute information into a command, and an output part that outputs, to a robot controller connected to the robot, the command obtained by the position determination processing part.

This structure allows the coordinates of the fixed via point having any single attribute among the approach position of the robot hand for holding the holding position, the holding position, and the retreat position after holding and the command that results from converting the attribute information on the fixed via point to be output to the robot controller, which in turn allows the user to create the robot program simply by describing the motion of the robot hand in accordance with each attribute information and then put the robot hand into motion.

As described above, the coordinates of the fixed via point having any single attribute among the approach position of the robot hand for holding the holding position, the holding position, and the retreat position after holding and the attribute information on the fixed via points can be output to the robot controller, which allows the user to create the robot program simply by describing the motion of the robot hand in accordance with each attribute information to enable a desired motion.

BRIEF DESCRIPTION OF THE DRAWINGS

FIG. 15A shows an example of a main program when the attribute information can be associated and registered on a user interface;

FIG. 15B shows an example of an action program when the attribute information can be associated and registered on the user interface;

FIG. 16 shows an example of the main program when the attribute information cannot be associated and registered on the user interface;

FIG. 18 is a diagram corresponding to FIG. 15A when a fixed via point is added;

FIG. 19 is a diagram showing data arrays of via points and attribute information when the attribute information is processed by the robot controller side;

FIG. 20 is a diagram showing data arrays of via points and attribute information when the attribute information is processed by the measuring device;

FIG. 21 is a diagram corresponding to FIG. 15A when the attribute information is processed by the measuring device side;

FIG. 22 is a diagram corresponding to FIG. 20 when via point data is included in a command array;

DETAILED DESCRIPTION OF PREFERRED EMBODIMENTS

Hereinafter, embodiments of the present invention will be described in detail with reference to the drawings. Note that the following description of the preferred embodiments is merely an example in essence, and is not intended to limit the present invention, an application of the present invention, and a use of the present invention.

Figure 1:
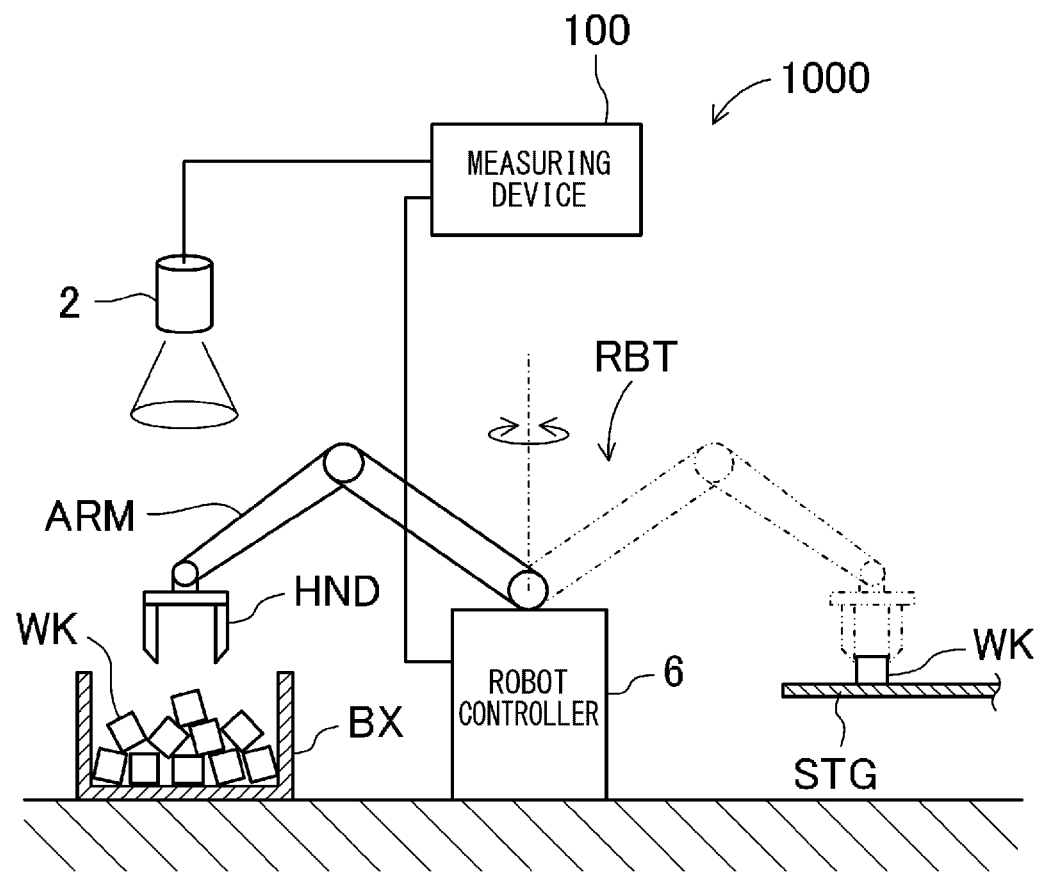
FIG. 1 is a schematic diagram showing how a workpiece is conveyed by a robot system.

FIG. 1 is a schematic diagram showing a structure example of a robot system 1000 including a measuring device 100 according to the embodiment of the present invention. FIG. 1 shows an example of how bulk picking is performed where a plurality of workpieces WK placed in a work space in a manufacturing factory for various products are held by a robot RBT one by one, conveyed to a stage STG installed at a predetermined location, and placed on the STG.

The robot system 1000 includes the robot RBT and a robot controller 6 that controls the robot RBT. The robot RBT is a general-purpose industrial robot, and has its base fixed to a floor surface of the factory or the like. The robot RBT is also referred to as, for example, a manipulator, and is configured to be of a 6-axis control type. The robot RBT includes an arm ARM that extends from the base and a robot hand HND provided at an end of the arm ARM. The arm ARM may be configured to be of an articulated type including a plurality of joints as movable parts. The robot hand HND can be moved to a desired position within a motion range through motion of each joint of the arm ARM and rotation of the arm ARM itself.

Figure 4A:
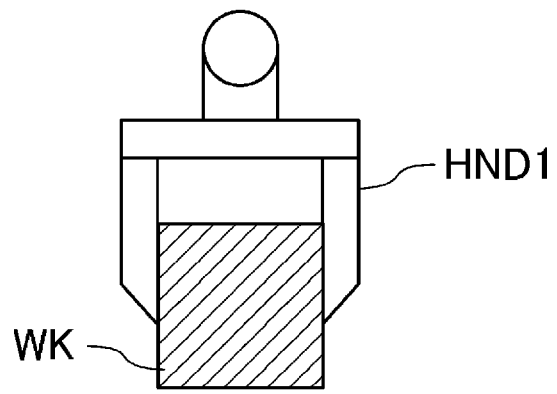
FIG. 4A is a schematic diagram showing an example how the workpiece is held by a robot hand.
Figure 4B:
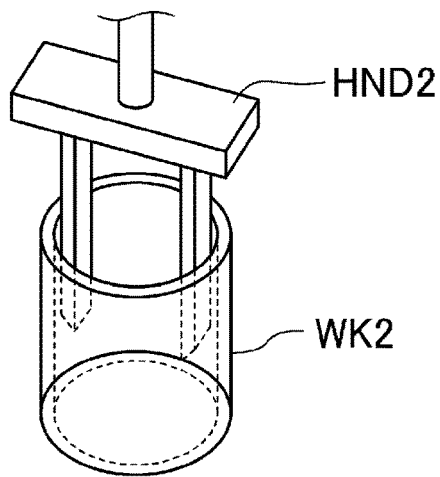
FIG. 4B is a schematic diagram showing an example of how a hollow workpiece is held by a robot hand with the robot hand in contact with an inner surface of the hollow workpiece.
Figure 4C:
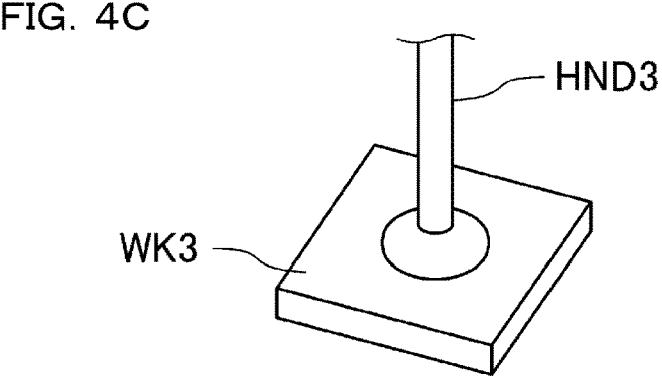
FIG. 4C is a schematic diagram showing an example of how a plate-shaped workpiece is suctioned and held by a robot hand.

The robot hand HND is capable of holding the workpiece WK, and a structure of the robot hand HND is not particularly limited. Examples of the robot hand HND include a robot hand HND 1 structured to hold the workpiece WK with an outer side of the workpiece WK held by the robot hand HND 1 as shown in FIG. 4A, a robot hand HND2 structured to hold a hollow workpiece WK2 with claws of the robot hand HND2 inserted into the hollow workpiece WK2 and opened as shown in FIG. 4B, a robot hand HND3 structured to hold a plate-shaped workpiece WK3 with the plate-shaped workpiece WK3 suctioned by the robot hand HND3 as shown in FIG. 4A, and the like, and any of the robot hands may be used. Further, herein, "hold" is used as meanings including all examples where the outer side of the workpiece WK is held as shown in FIG. 4A; the claws are inserted into and opened in the hollow of the workpiece WK; and the workpiece WK is suctioned.

The robot controller 6 controls the motion of the arm ARM, opening and closing motion (holding motion) of the robot hand HND or the like. Further, the robot controller 6 acquires information necessary for controlling the robot RBT from the measuring device 100 shown in FIG. 2. For example, the measuring device 100 acquires a position and orientation of each of the workpieces WK that are a large number of parts randomly placed in a container BX shown in FIG. 1 using a sensor 2 such as a three-dimensional camera or light to detect the position and orientation of the workpiece WK, and the robot controller 6 acquires the information on the position and orientation of the workpiece WK.

Figure 2:
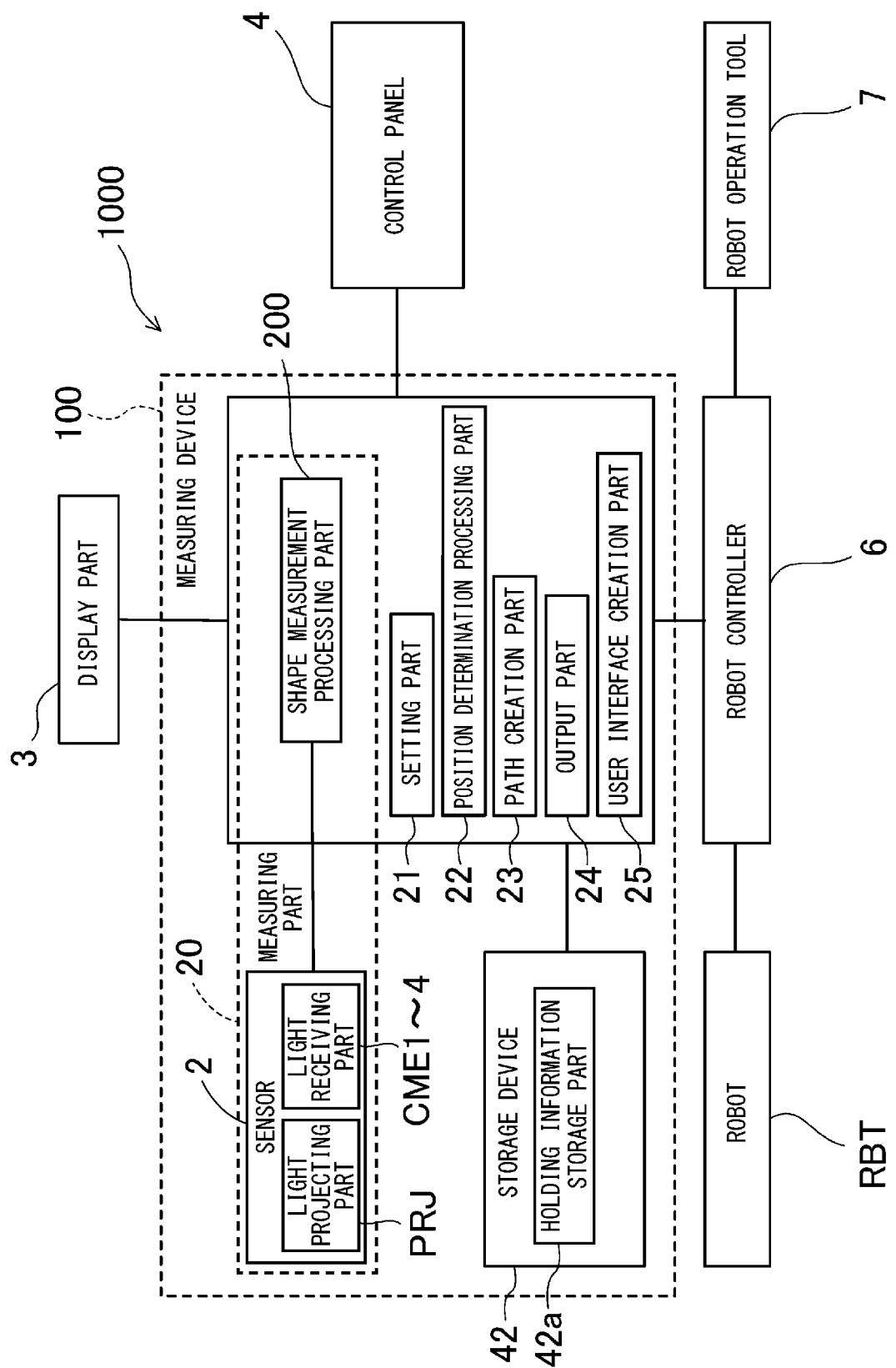
FIG. 2 is a block diagram showing a structure of the robot system.

FIG. 2 shows a functional block diagram of the robot system 1000. The robot system 1000 shown in FIG. 2 includes the measuring device 100, a display part 3, a control panel 4, and a robot operation tool 7, in addition to the robot RBT and the robot controller 6.

The control panel 4 is configured to make various settings. The measuring device 100 further includes a measuring part 20 that captures an image of the workpiece WK to measure the position and orientation of the workpiece WK. Further, a user can make various settings, a confirmation of the motion state of the robot RBT, a confirmation of the motion state of the measuring device 100, and the like on the display part 3.

On the other hand, the robot controller 6 is a well-known member configured to control the robot RBT in accordance with a signal output from the measuring device 100. Further, the robot operation tool 7 makes motion settings of the robot RBT. Note that, in the example shown in FIG. 2, the control panel 4 and the robot operation tool 7 are separate members, but may be integrated into a shared member.

The sensor 2 is a member called a robot vision or the like that captures an image of the work space or workpiece WK, and according to the present embodiment, at least the workpiece WK is an object to be imaged, and the object to be imaged may include the container BX. It is possible to acquire, from the image captured by the sensor 2, three-dimensional shape data (image data) representing the three-dimensional shape of each of the workpieces WK stowed in bulk. It is also possible to acquire three-dimensional shape data representing the three-dimensional shape of the container BX from the image captured by the sensor 2.

Note that examples of the method for acquiring the three-dimensional shape of the workpiece WK or the container BX include a pattern projection method, a stereo method, a shape-from-focus method, a light-section method, an optical radar method, an interferometry method (white interferometry method), a TOF method, and the like, and any of the methods may be used. Since each method is well known, no detailed description will be given. According to the present embodiment, among types of the pattern projection methods, a phase shift method is used in which pattern light having a periodic illuminance distribution is applied to an object to be imaged, and light reflected off a surface of the object to be imaged is received.

The sensor 2 and a shape measurement processing part 200 make up the measuring part 20. The shape measurement processing part 200 is capable of measuring not only the position and orientation, shape, and size of each part of the workpiece WK, but also the position, shape, and size of the container BX based on the image data acquired by the sensor 2. The shape measurement processing part 200 may be a part of the measuring device 100, but may be structured as a separate member.

Figure 3:
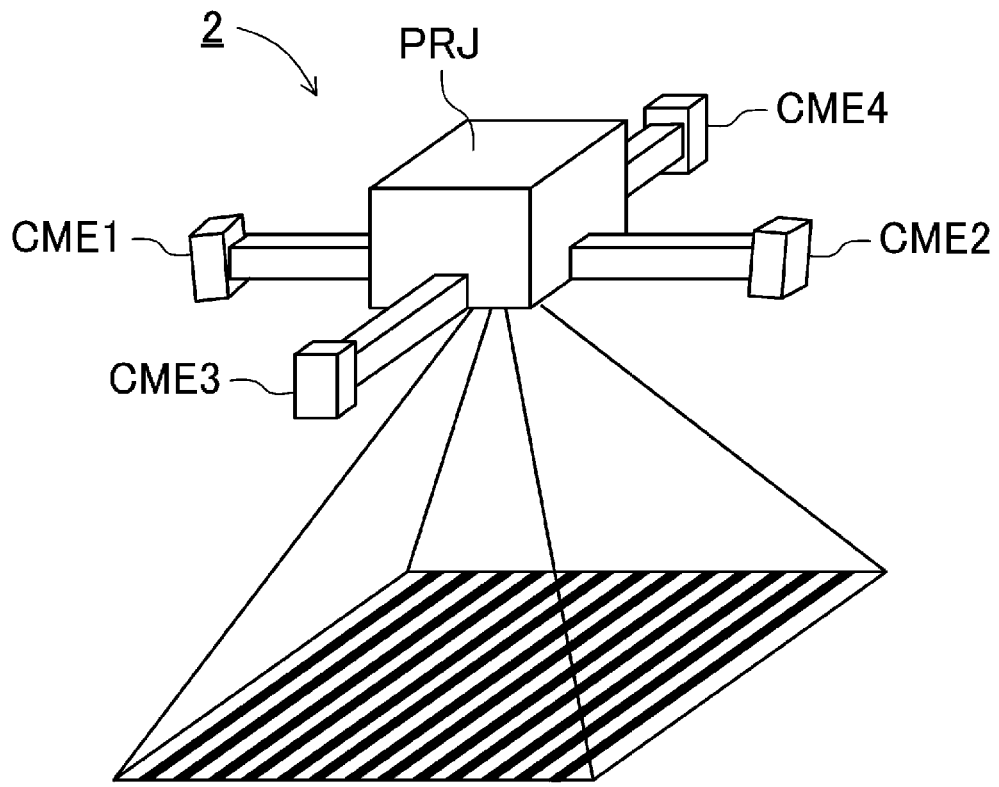
FIG. 3 is a perspective view showing an example of a sensor.

The measuring part 20 may be a two-dimensional measuring part capable of making a two-dimensional measurement in an X direction and Y direction, or a three-dimensional measuring part capable of making a three-dimensional measurement in a Z direction (height direction) in addition to the X direction and Y direction. The specific structure of the sensor 2 included in the measuring part 20 is determined based on a three-dimensional shape measuring method. In this example, the sensor 2 includes a camera, a light, a projector, or the like. For example, in a case where the three-dimensional shape of the workpiece WK is measured by the phase shift method, as shown in FIG. 3, a projector (light projecting part) PRJ, a plurality of cameras (light receiving parts) CME1, CME2, CME3, CME4 are provided as the sensor 2. The projector PRJ is a member that irradiates the workpiece WK with light. The cameras CME1, CME2, CME3, CME4 are members each equipped with an imaging sensor that receives light that is projected by the projector PRJ and reflected off the surface of the workpiece WK. A light source of the light projecting part may be made up of, for example, a plurality of light emitting diodes, a liquid crystal panel, an organic EL panel, a digital micromirror device (DMD), or the like.

The sensor 2 may be made up of a plurality of members such as the cameras CME1, CME2, CME3, CME4 and the projector PRJ, or alternatively, may be made up of one united body of such members. For example, a 3D imaging head that results from integrating the cameras CME1, CME2, CME3, CME4 and the projector PRJ into a head shape may serve as the sensor 2.

Further, the sensor 2 is further capable of creating three-dimensional shape data. In this case, the sensor 2 is provided with an image processing IC or the like that implements a function of creating three-dimensional shape data. Alternatively, another configuration may be employed in which the creation of the three-dimensional shape data is not performed by the shape measurement processing part 200 side, and a raw image captured by the sensor 2 is image-processed by another part of the measuring device 100 to form three-dimensional shape data such as a three-dimensional image.

Furthermore, calibration based on the image data acquired by the sensor 2 allows actual position coordinates of the workpiece WK (coordinates of the movement position of the robot hand HND) and position coordinates on the image displayed on the display part 3 to be linked.

The measuring device 100 performs a three-dimensional search, an interference determination, a holding solution calculation, and the like based on the three-dimensional shape data such as the position and orientation of the workpiece WK obtained by the measuring part 20. The measuring device 100 may be implemented by a general-purpose computer having a special-purpose image processing program installed therein, a purpose-built image processing controller, or special-purpose hardware. Alternatively, the measuring device 100 may be implemented by a special-purpose computer having an image processing program installed therein and including hardware such as a graphic board specialized in image inspection processing.

Note that FIG. 2 shows an example where the sensor 2 and the shape measurement processing part 200 included in the measuring part 20 are separate members, but the present invention is not limited to such a structure, and, for example, the sensor 2 and the shape measurement processing part 200 may be integrated into a single entity, a part of the sensor 2 may be incorporated into the shape measurement processing part 200, or alternatively, a part of the shape measurement processing part 200 may be incorporated into the sensor 2. As described above, the division of the members shown in FIG. 2 is an example, and a plurality of members may be integrated, or one member may be divided. For example, the control panel 4 and the robot operation tool 7 may be integrated into a shared member.

As shown in FIG. 1, the sensor 2 is separate from the robot RBT. That is, the sensor 2 is not provided on the arm ARM of the robot body 5, which is called an off-hand type. Note that the sensor 2 may be provided on the arm ARM.

As the display part 3, for example, a liquid crystal monitor, an organic EL display, a CRT, or the like may be used. The control panel 4 is a member for making various settings of, for example, various simulations or image processing, and an input device such as a keyboard or a mouse may be used. Further, the use of a touchscreen on the display part 3 allows the control panel 4 and the display part 3 to be integrated with each other.

For example, when the measuring device 100 is implemented by a computer having the image processing program installed therein, a graphical user interface (GUI) screen created through execution of the image processing program is displayed on the display part 3 as described later. Various settings can be made on the GUI displayed on the display part 3, and a processing result and the like can be displayed on the GUI. In this case, the display part 3 can also be used as a setting part or an input part for making various settings, and the setting part or the input part may include the control panel 4.

The robot controller 6 controls the motion of the robot based on, for example, information captured by the sensor 2, information output from the measuring device 100, or the like. The robot operation tool 7 is a member for making motion settings of the robot RBT, and a so-called pendant or the like may be used.

As shown in FIG. 1, a plurality of workpieces WK are randomly stored in the container BX. The sensor 2 is disposed above such a work space. The robot controller 6 identifies a workpiece WK to be held from among the plurality of workpieces WK based on the three-dimensional shape of the workpiece WK obtained by the sensor 2, and controls the robot RBT to hold the workpiece WK. Then, while holding the holding position of the workpiece WK, the arm ARM is moved to a predetermined placing position, for example, onto the stage STG, to place the workpiece WK in a predetermined orientation. In other words, the robot controller 6 controls the motion of the robot RBT to cause the robot hand HND to hold a workpiece WK to be picked (to be held) that has been identified by the sensor 2 and the measuring device 100, place the workpiece WK thus held onto a placing location (stage STG) in a predetermined reference orientation, and then open the robot hand HND. Examples of the stage STG include a conveyor belt and a pallet. Further, the holding motion may be referred to as picking, and the holding position may be referred to as a picking position. Further, the placing motion may be referred to as a place, and the placing position may be referred to as a place position.

The picking according to the present embodiment is not limited to bulk picking, and a workpiece WK placed in any manner can be conveyed by the robot RBT. Herein, bulk picking means not only that the workpieces WK randomly stowed in the container BX are each held by the robot RBT and placed at a predetermined position, but also an example where the workpieces WK stowed in a predetermined area without the use or a container are each held and placed, or an example where the workpieces WK arranged and stowed in a predetermined orientation are sequentially held and placed. Further, it is not always necessary that the workpieces WK are stowed, and a state where the workpieces WK are randomly placed on a plane without overlapping each other is also referred to as stowed in bulk herein (this is because sequential picking is performed, and even when the workpieces WK do not overlap each other at the final stage of picking, the state is still referred to as bulk picking). Note that the present invention is not necessarily limited to bulk picking, and is also be applicable to a case where the workpieces WK that have not been stowed in bulk are picked up.

Further, in the example shown in FIG. 1, the sensor 2 is fixed above the work space, but the fixed position of the sensor 2 may be any position where the sensor 2 can capture an image of the work space; therefore, the sensor 2 may be disposed at any position such as a position obliquely above the work space, a position on a side of the work space, a position below the work space, or a position obliquely below the work space. Alternatively, another aspect may be employed where the sensor 2 is disposed in a movable manner at an unfixed position such as a position above the arm ARM. Further, the numbers of cameras and lights included in the sensor 2 are not limited to one, and may be plural. Furthermore, the connection with the sensor 2, the robot RBT, and the robot controller 6 is not limited to a wired connection, and may be a known wireless connection.

When the bulk picking motion is performed by the robot system 1000, it is possible to perform teaching including settings for performing the bulk picking motion in advance. Specifically, it is possible to register which part of the workpiece WK is held by the robot hand HND, which orientation the robot hand HND holds the workpiece WK in a holding position, an orientation when the workpiece WK is held, and the like, and to register a placing position, an orientation when the workpiece WK is placed, and the like. Such settings may be made by the robot operation tool 7 such as a pendant. Further, as will be described later, the settings may be made on a vision space without operation of the actual robot RBT.

The display part 3 three-dimensionally displays a work model that virtually represents the three-dimensional shape of the workpiece WK or a robot hand model made up of three-dimensional CAD data that virtually represents the three-dimensional shape of the robot hand HND in a virtual three-dimensional space. The display part 3 can further display a basic direction image of the work model as six orthogonal views. This allows the setting work of the holding position to be made with each orientation of the work model displayed in the form of six orthogonal views, which facilitates the setting work of the holding position that is a difficult work in the related art.

Figure 5:
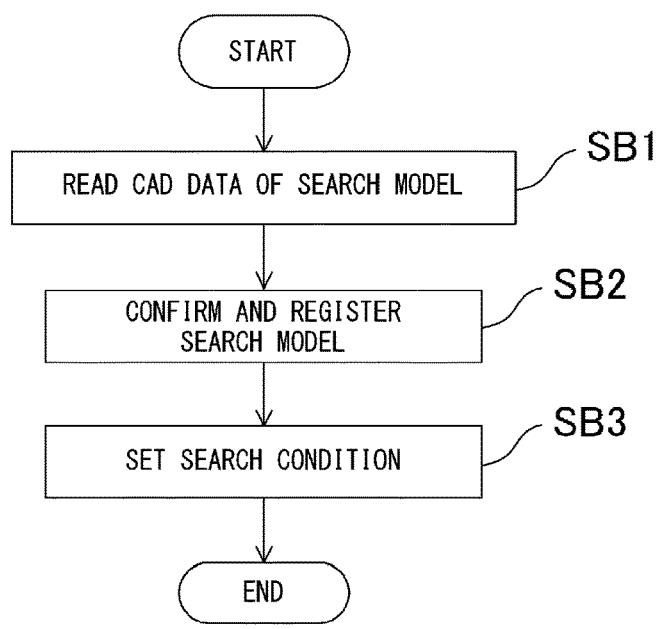
FIG. 5 is a flowchart showing a procedure for setting a search model.
Figure 6:
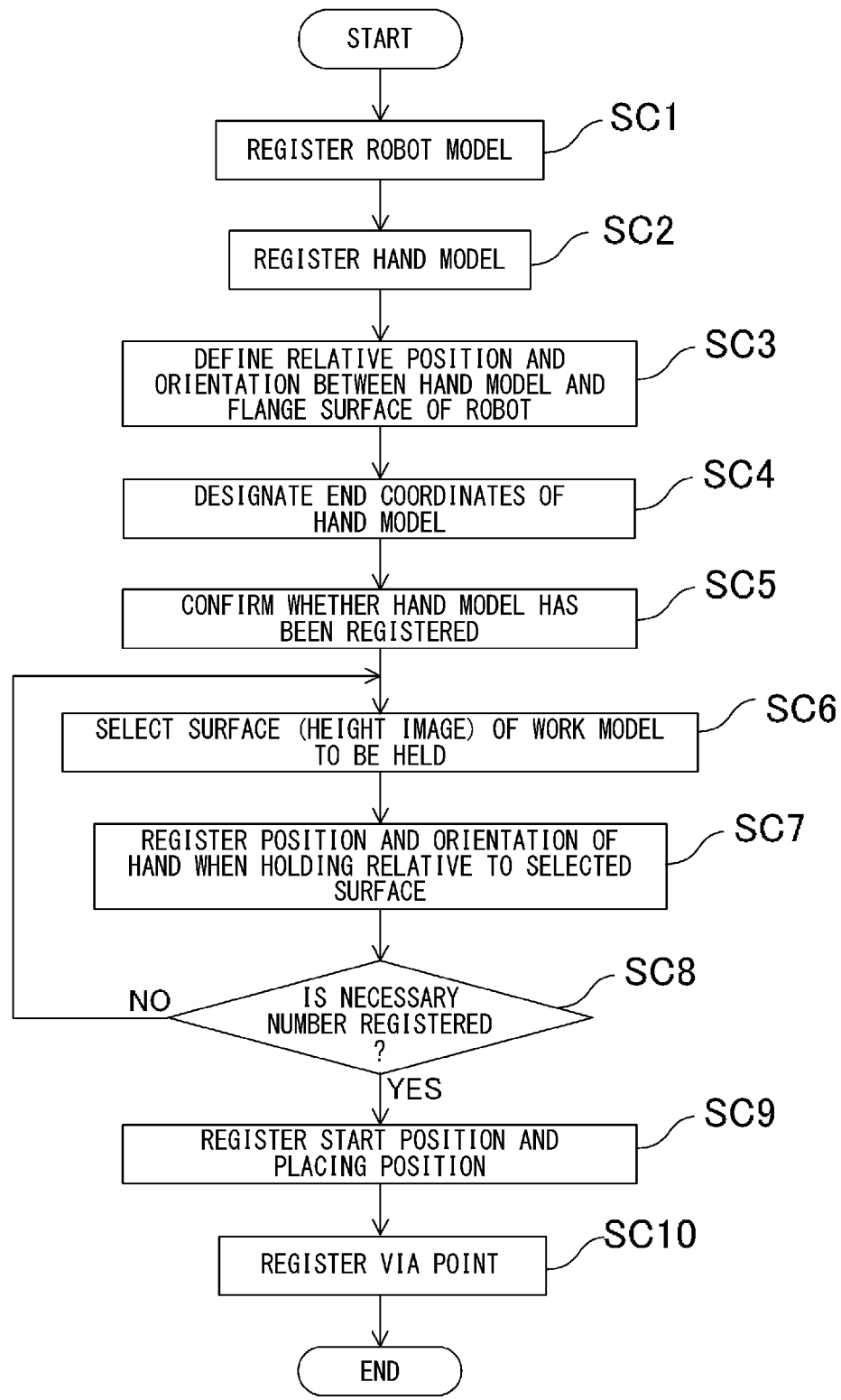
FIG. 6 is a flowchart showing a procedure for setting a hand model and a holding position.

(Setting procedure) FIG. 5 is a flowchart showing a procedure for setting a search model, and FIG. 6 is a flowchart showing a procedure for setting a hand model and holding position. The method described below is an example, and the search model may be created from CAD data, or alternatively, may be created from point cloud data captured by the sensor 2, and the data from which the search model is created is not particularly limited.

Either of the setting of the search model and the setting of the robot model, the hand model, and the holding position may be made first. The setting of the search model and the setting of the robot model, the hand model, and the holding position may be made by a setting part 21 shown in FIG. 2.

In step SB1 after the start of the flowchart showing the procedure for setting the search model shown in FIG. 5, the search model of the workpiece WK is registered. The search model of the workpiece WK is a model that represents the shape of the workpiece WK and is used when a search process to be described later is performed. When the search model of the workpiece WK is registered in step SB1, three-dimensional CAD data (CAD model) of the workpiece WK is read and temporarily stored in a storage device 42 of the measuring device 100. The CAD data corresponds to data of the search model of the workpiece WK, and may be data in a format that is commonly used in the related art.

Further, the search model of the workpiece WK may be, for example, an interference determination model created based on a surface shape as viewed from a certain surface. That is, it is possible to use a model in which a point cloud for use in search is extruded to a zero plane (workpiece WK placement plane) as the interference determination model. As a procedure for acquiring the interference determination model, first, point cloud information on the search model is acquired, and then a height (extrusion amount) of the search model and a model footprint are obtained from plane information on the zero plane. At this time, a background may be removed by using a background removal threshold or by masking. Then, the point cloud is extruded by the extrusion amount. At this time, only height information on a range of the footprint is used. In order to fill in holes or remove noise, the point cloud information or the height image is optionally subjected to dilation and erosion in the X and Y directions.

When the surface of the interference determination model is converted into polygons, the polygons may be of a vertex index type. This allows the polygons to be represented in the form of a vertex array and a vertex index array, which is easier to handle and requires less capacity than the STL format, for example. When the surface of the interference determination model is converted into polygons, a polygon reduction process may be optionally performed. Further, the point cloud information may be optionally thinned. Furthermore, when the point cloud is represented by a height image, a pixel value may be reduced through image reduction.

Even when the workpiece WK has a complicated shape, the shape extruded as described above surrounds a larger area, and is therefore effective for interference determination. Further, it is not necessary to combine a plurality of surfaces, which makes the operation simple. Furthermore, providing a plurality of extruding interference determination models for a certain workpiece WK makes it possible to select an interference determination model most suitable for the holding position and orientation or the search position and orientation.

Further, as the search model of the workpiece WK, the STL format that is the simplest among CAD data formats may be used. The STL format is data made up of only a list of pieces of triangular polygon information (coordinates of three points and a normal vector of the surface). Alternatively, the search model of the workpiece WK may be made up of point cloud data containing three-dimensional information. Alternatively, the search model of the workpiece WK may be made up of image data containing height information, for example, a height image or a distance image.

After the CAD data of the search model of the workpiece WK is read in step SB1, the process proceeds to step SB2 in which the search model of the workpiece WK is confirmed and registered. For example, displaying the CAD data of the search model of the workpiece WK thus read on the display part 3 allows the user of the measuring device 100 to confirm whether the search model is a desired search model. When the result shows that the search model is the desired search mode, the search model is registered in the measuring device 100. When the result of the confirmation shows that the search model is not the desired search model, another CAD data is read, and the confirmation is performed again.

In step SB2, when the search model of the workpiece WK is registered, a circumscribed cuboid of the CAD model is defined, and an origin correction process is performed to correct the center of this circumscribed cuboid to the origin of the CAD. The origin of the search model of the workpiece WK is automatically determined by the measuring device 100 from the coordinate information contained in the three-dimensional CAD data. For example, it is possible to define, with respect to the three-dimensional CAD data of the search model of the workpiece WK, a virtual cuboid circumscribing the search model and then set the center of gravity of this virtual cuboid as the origin of the search model.

Further, six surfaces of the CAD model read in step SB1, that is, the height image of the CAD model viewed from each direction of "top", "bottom", "left", "right", "front", and "rear" is created in step SB2. First, six pieces of height image data are created, the six pieces of height image data corresponding to a plan view, bottom view, left side view, right side view, front view, and rear view of the CAD model. The height image is obtained from this height image data. The "top" corresponds to a height image viewed from a positive direction of the Z axis (plus side), the "bottom" corresponds to a height image viewed from a negative direction of the Z axis (minus side), the "left" corresponds to a height image viewed from a negative direction of the X axis, the "right" corresponds to a height image viewed from a positive direction of the X axis, the "front" corresponds to a height image viewed from a negative direction of the Y axis, and the "rear" corresponds to a height image viewed from a positive direction of the Y axis. However, these are merely examples, and a different coordinate system may be used, and, based on a coordinate system orthogonal to an axis corresponding to a straight line of X=Y in the XY plane, height images viewed from the positive and negative directions of each axis may be used. Further, when the height image is created from the three-dimensional CAD data, the height image need not necessarily be a height image viewed from a direction ("top", "bottom", "left", "right", "front", "rear") orthogonal to each axis of the CAD data, and, for example, with the orientation (viewpoint) of the search model of the workpiece WK changed as desired, the height image may be created based on the changed viewpoint.

Further, since the CAD model is made up of three-dimensional CAD data, the three-dimensional CAD data is converted into height images viewed from the plus direction and minus direction of each of the X, Y, and Z coordinates of the CAD model, thereby generating height images of the six surfaces of the CAD model.

It is also possible to delete a height image that has the same appearance among the six height images created as described above. The appearance matching/mismatching is determined based on whether height images, created based the height image data, of six surfaces viewed from the top and bottom of the workpiece (positive and negative directions of the Z axis), the front and rear (positive and negative directions of the Y axis), and the left and right (positive and negative directions of the X axis) match each other. Herein, the workpiece WK is rotated by 90° each time for matching determination, and a surface that appears to match any other surface is excluded from registration targets of the search model of the workpiece WK.

After the exclusion, remaining height image data is stored. Information showing whether the height image data to be stored corresponds to an image viewed from the top, bottom, left, right, front, or rear of the CAD model, that is, information on the direction, is added to the height image data, and the information on the direction and the height image data are stored in the storage device 42 in association with each other. This allows each height image data to be stored together with relation information on each of the top, bottom, left, right, front, and rear surfaces. Note that only the height image data may be stored without storing the relation information on each surface.

The above-described method is applicable to a case where the CAD data of the workpiece WK exists, but when there is no CAD data of the workpiece WK, a plurality of height images of the search model of the workpiece WK viewed from different directions may be registered as the search model. That is, the workpiece WK with the surface to be registered facing upward is placed on a plane, and a three-dimensional measurement is performed. This three-dimensional measurement may be performed using the sensor 2 and the shape measurement processing part 200 of the robot system 1000. The measurement data obtained through the three-dimensional measurement performed by the shape measurement processing part 200 is output from the shape measurement processing part 200, and the height image data of the surface of the workpiece WK to be registered can be obtained based on the measurement data accordingly.

After the height image is obtained based on the height image data thus obtained, the height image is registered as a search model. After the registration, a determination is made as to whether height images necessary for search have been registered. This determination may be made by the user, or alternatively, may be made by the measuring device 100 or an image processing device 300. That is, when the shapes of the workpiece WK viewed from each direction of top, bottom, left, right, front, and rear are different from each other, it is preferable to obtain height images of all of the six surfaces, but as in a case of the rectangle described above, when there are surfaces having the same shape, it is not necessary to obtain height images of all the six surfaces. When height images necessary for search have been registered, the process is brought to an end.

In step SB3 after step SB2 in the flowchart shown in FIG. 5, a search condition is set. The search condition includes, for example, the number of workpieces WK that can be detected during search, the lower limit of a correlation value between the search model and the workpiece WK, a feature extraction condition (edge extraction threshold and the like), and the like. The search condition is set by the user and received by the setting part 21.

Next, a flowchart showing a procedure for setting a hand model and holding position shown in FIG. 6 will be described. In step SC1 after the start, a robot model is registered. The robot model specifies various information on the robot RBT used on site. The various information on the robot RBT includes, for example, a length of the arm ARM, a motion range of the arm ARM, a position of the robot RBT, a swing speed and rotation speed of the movable part of the arm ARM, and the like. The various information on the robot RBT may include a model representing the shape of the robot RBT. In this case, polygon data (CAD data) of the robot RBT is read. This step is a robot model registration step.

After the registration of the robot model in step SC1, the process proceeds to step SC2, and then a robot hand model is registered. The robot hand model is a model representing the shape of the robot hand. When a hand model of the robot RBT is registered, polygon data (CAD data) of the robot hand is read.

Then, after proceeding to step SC3, a relative position and orientation between the robot hand model registered in step SC2 to a flange surface of the robot model (registered in step SC1) to which the robot hand model is attached are defined. Specifically, a positional relation between the two is defined such that an attachment surface of the robot hand model and the flange surface of the robot model match.

In step SC4 after step SC3, end coordinates of the robot hand model mounted on the flange surface of the robot model are designated. This end coordinates can be obtained from the robot controller 6 or set by the user. Then, in step SC5, whether the robot hand model has been registered is confirmed.

After the robot hand model is registered as described above, the process proceeds to step SC6. In step SC6, a surface of the search model to be held by the hand model is selected. The surface of the search model can be represented by the height image registered in the flowchart shown in FIG. 5, and a height image corresponding to a surface that can be held by the robot hand model is selected from among the plurality of height images registered. The user can operate the control panel 4 to select the corresponding height image from height images displayed on the display part 3.

After the height image is selected in step SC6, the process proceeds to step SC7, and the position and orientation of the robot hand HND when holding the surface selected in step SC6 are registered. For example, it is possible to input X-axis coordinates, Y-axis coordinates, Z-axis coordinates, a rotation angle about the X axis, a rotation angle about the Y axis, a rotation angle about the Z axis individually, and move the robot hand model in accordance with the values thus input to be placed at a desired position in the height image. This makes it possible to set which part of the search model is held by the robot hand and which orientation the robot hand model holds the search model in, that is, the holding position and orientation, while adjusting the position of the robot hand model. The holding position and orientation may be set by not only inputting numerical values, but also directly operating the robot hand model with a mouse of the control panel 4, for example.

The holding position thus set is a possible holding position held by the robot hand HND. A plurality of possible holding positions held by the robot hand HND can be each set in association with a corresponding search model of the workpiece WK already registered. For example, two possible holding positions can be set in association with one search model, and four possible holding positions can be set in association with another search model. Holding information showing the possible holding position of the workpiece WK thus set can be stored in association with the search model in a holding information storage part 42a (shown in FIG. 2) of the storage device 42 included in the measuring device 100.

In general, a plurality of possible holding positions are often registered for one workpiece WK. This is because if a plurality of possible holding positions are registered, the optimum solution can be selected from among a plurality of holding solutions, and if a possible holding solution tentatively obtained cannot be the final solution due to, for example, interference of the robot hand HND with another object and there is another possible holding solution, the possibility of determination that holding is possible increases. In a configuration where a plurality of such possible holding positions are registered one by one from the beginning, a lot of time and effort is required to register similar possible holding positions, which makes the work time-consuming. Therefore, copying already registered possible holding position information and changing some position parameters set for this possible holding position to allow the possible holding position information to be saved as a new possible holding position makes it possible to register, without time and effort, a plurality of possible holding positions in a simplified manner. Further, similarly, it is possible to read out an existing possible holding position, appropriately modify the position parameter, and save the change.

When the possible holding position is registered, a relative position and orientation of the robot hand model at the time of holding the search model of the workpiece WK to the origin of the search model is registered. On the other hand, when the workpiece WK is picked by the actual robot hand HND, it is required that vision coordinates that are coordinates in the three-dimensional space (vision space) corresponding to an image of the workpiece WK captured by the sensor 2 be converted into robot coordinates to be used when the robot controller 6 actually puts the robot RBT into motion.

Specifically, the position and orientation of the search model of the workpiece WK is obtained from a position (X, Y, Z) and orientation ($R_X$, $R_Y$, $R_Z$) in the vision space (the orientation ($R_X$, $R_Y$, $R_Z$) represents an orientation expressed by ZYX Euler angles). Further, the orientation of the robot hand model that holds the same is also obtained as the position (X, Y, Z) and the orientation ($R_X$, $R_Y$, $R_Z$) in the virtual three-dimensional space of the measuring device 100. Based on the position and orientation in such a vision space, in order for the robot controller 6 to put the robot RBT into motion, the position and orientation need to be converted into a position (X', Y', Z') and orientation ($R_X'$, $R_Y'$, $R_Z'$). A process of obtaining a conversion expression for converting the position and orientation calculated in the displayed coordinate system into the position and orientation in the coordinate system in which the robot controller 6 puts the robot hand HND into motion is called calibration. This calibration can be performed by a known method in the related art.

In step SC8 of the flowchart shown in FIG. 6, a determination is made as to whether the necessary number of possible holding positions have been successfully registered. When there are a large number of parts that can be held by the robot hand HND, the number of possible holding positions to be registered will increase, but this is a matter for the user to determine, so that the determination in step SC8 is made by the user. When it is determined to be NO in step SC8, the necessary number of possible holding positions have yet to be registered, and there are other possible holding positions to be registered left, the process proceeds to step SC7 via step SC6, and the other holding positions are set and registered. That is, the holding information storage part 42*a* is capable of storing a plurality of pieces of holding information. On the other hand, when it is determined to be YES in step SC8, and the necessary number of possible holding positions have been registered, the process proceeds to step SC9.

In step SC9, a start position and a placing position where the held workpiece WK is placed are registered. The start position is a position where the sensor 2 is put on standby to capture an image.

On the other hand, the placing position is a position where the workpiece WK is placed by the robot hand HND, and can be set, for example, to a position on the stage STG shown in FIG. 1. The start position and the placing position can be set by a method in which coordinates and the like are input numerically, or alternatively, can be set by, for example, direct operation of the robot hand model with a mouse or the like of the control panel 4.

Upon completion of step SC9, the process proceeds to step SC10. In step SC10, a via point through which the workpiece WK passes when moving from the holding position to the placing position is registered. Two or more via points may be registered. The via point may be registered for a plurality of places, and in this case, the via points may be named as a via point 1, a via point 2, or the like and then stored. In this example, a description will be given of a configuration where the via point is registered by the user, but the present invention is not limited to such a configuration, and the measuring device 100 may be configured to calculate the via point and present the via point to the user. In this case, step SC10 will be skipped.

The via point registered in step SC10 is a point through which the robot hand HND or the workpiece WK passes until the workpiece WK is placed at the placing position after the robot hand HND holds the workpiece WK. The via point may be set by a method in which coordinates, or the like are input numerically, or alternatively, may be set by, for example, direct operation of the robot hand model with a mouse or the like of the control panel 4. When the via point is set, the motion of the arm ARM and the motion of robot hand HND are set such that a part of the robot hand HND or a part of the workpiece WK passes through the via point while the workpiece WK held by the robot hand HND is being conveyed from the start position to the placing position.

Further, the setting part 21 is capable of setting a standby position of the robot hand HND and setting a via point on a forward path through which the robot hand HND passes until the robot hand HND located at the standby position holds the workpiece WK in the container BX. The standby position of the robot hand HND and the via point on the forward path may be set by a method in which coordinates and the like are input numerically, or alternatively, may be set by, for example, direct operation of the robot hand model with a mouse or the like of the control panel 4.

Note that the via point may be given as robot coordinates (XYZ, RxRyRz), but the via point is desirably given as a joint angle of the arm ARM. As a result, the arm position of the robot to be subjected to the interference determination is uniquely determined.

The joint angle can be obtained from the robot coordinates such as the holding position in the measuring device 100 and transmitted to the robot controller 6 side. The designated position can be designated on the user interface as either the robot coordinates or the joint angle. The mechanism for obtaining the joint angle from the robot coordinates is referred to as "inverse kinematics", and is applied to the path creation as with the interference determination.

Figure 7:
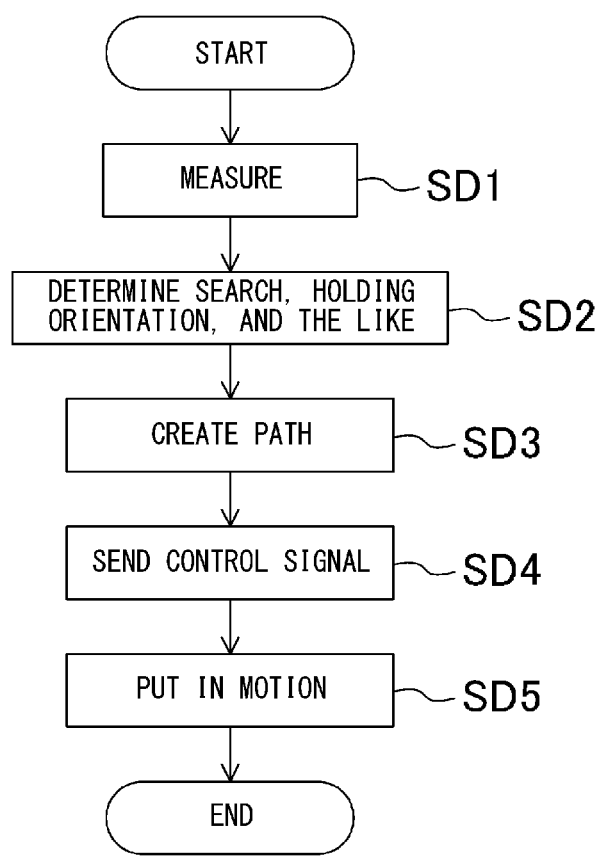
FIG. 7 is a diagram showing an example of a flowchart of basic control of a robot.

(Basic control of robot) FIG. 7 is a diagram showing an example of a flowchart of basic control of the robot RBT. In step SD1 after the start, the measuring part 20 captures an image of the workpiece WK, measures the position and orientation of the workpiece WK, and creates data for use in search process (height image data) to be performed in step SD2. Since the measuring part 20 can perform a three-dimensional measurement, the data for use in search process may contain height information.

Subsequently, the process proceeds to step SD2, and the search process of detecting the position and orientation of the workpiece WK is performed on the data for use in search process created in step SD1. The search process makes a search on the data for use in search process containing the height information, and thus can be referred to as a three-dimensional search. Specifically, based on the registered search model of the workpiece WK, the orientation and position of the workpiece WK are identified, but, first, the data for use in search process is searched for a position and orientation (X, Y, Z, $R_X$, $R_Y$, $R_Z$) where characteristic points of the search model most closely match. $R_X$, $R_Y$, $R_Z$ denote a rotation angle about the X axis, a rotation angle about the Y axis, and a rotation angle about the Z axis, respectively. Although various methods for representing such rotation angles have been proposed, the Z-Y-X Euler angles may be used herein. Further, the number of matching positions and orientations need not be one for each search model, and a plurality of matching positions and orientations may be detected.

As the search model for use in three-dimensional search, the use of the image of the workpiece WK viewed from each surface like six orthogonal views has an advantage that the calculation process of the three-dimensional search can be simplified as compared with a case where a perspective view is used, the processing load can be reduced, and the processing speed can be increased. Further, the displayed state can be easily seen even during the registration of the search model, and is visually recognizable by the user. Further, a result of superimposing and displaying each characteristic point of the search model can be displayed two-dimensionally or three-dimensionally at the position of the result of the three-dimensional search. In a manner that depends on how many corresponding characteristic points exist in the data for search process (for example, a proportion of characteristic points in the data for use in search process with an error of a certain distance or less, and the like), the search results can be scored.

As a result of searching whether a registered search model exists, when no search model exists in the data for use in search process, that is, when the workpiece WK cannot be detected, this flowchart is terminated.

Further, in step SD2, a position determination processing part 22 shown in FIG. 2 determines the holding position, held by the robot hand HND, of the workpiece WK placed in the work space based on a result of the measurement made by the measuring part 20 and the holding information stored in the holding information storage part 42a.

For example, a determination is made as to whether the three-dimensional point cloud represented by pixel data of each point of the height image that is the data for use in search process interferes with the robot hand model that is input in advance. Prior to this interference determination, the position (holding coordinates) where the robot hand HND needs to be disposed and the orientation of the robot hand HND relative to a workpiece WK detected by the three-dimensional search are calculated based on the position of the workpiece WK and the holding orientation of the registered workpiece WK. At the position thus calculated, a determination is made as to whether the robot hand HND interferes with a surrounding object. In this interference determination, it is possible to determine whether or not the three-dimensional point cloud interfere with a section model by using the section model of the robot hand HND. For example, when all the three-dimensional points are away from the section model of the robot hand HND, it is determined that the three-dimensional point cloud, that is, the height image and the hand model HND, do not interfere with each other, while when at least one of the three-dimensional points is located inside the section model of the robot hand HND, or at least one of the three-dimensional points is in contact with edge part of the section model of the robot hand HND, it is determined that the three-dimensional point cloud, that is, the height image and the hand model HND, interfere with each other. When there is no interference, it shows that the holding solution has been successfully calculated for this workpiece WK, that is, the holding position has been successfully calculated, and the process proceeds to step SD3. On the other hand, when there is interference, it shows that the holding solution has failed to be calculated for this workpiece WK, and this flowchart is terminated or an attempt is made to calculate a holding solution for another workpiece WK.

Further, in step SD3, a path creation part 23 shown in FIG. 2 creates a path of the robot hand HND from the current position of the robot hand HND to the holding position calculated in step SD2 via the approach position and further creates a path of the robot hand HND from the start position (holding position) to the placing position. The path created in this step SD3 is a path passing through the via point. Further, the path created in step SD3 may include a path not passing through the via point.

In step SD4, an output part 24 outputs the coordinates of the holding position, placing position, via point, and the like. The robot controller 6 receives the coordinates of the holding position, placing position, via point, and the like output from the output part 24, creates a control signal, and outputs the control signal thus created to the robot RBT. Subsequently, in step SD5, the robot RBT operates in accordance with the control signal to convey the workpiece WK through the predetermined path.

Points output by the path creation part 23 to the robot controller 6 include a fixed via point (a fixed point set by the user, and the approach position, holding position, and retreat position automatically calculated by the path creation part 23) and an intermediate via point for path creation (a point automatically calculated by the path creation part 23). As the via point to be output to the robot controller 6, either each joint value of the arm ARM or XYZ and RxRyRz may be output.

If the path creation part 23 only outputs the approach position, the holding position, or the like, it is necessary to make the program on the robot controller 6 side to avoid an obstacle such as the container BX, which makes the program complicated and makes it difficult for the user to customize the program. On the other hand, as in the present example, causing the path creation part 23 to plan the entire motion of the robot hand HND and output some intermediate via points to the robot controller 6 has an advantage that the programming on the robot controller 6 side can be simplified.

However, since the number of via points through which the robot hand HND needs to pass is not determined unless the motion path of the robot RBT is actually created, via points where the robot controller 6 needs to cause the robot hand HND to perform the holding motion or the placing motion cannot be identified.

Further, when the user increases or decreases the number of fixed via points, the number of via points output by the measuring device 100 and the number of via points expected by the program on the robot controller 6 side become different from each other unless reprogramming is made on the robot controller 6 side. Therefore, each time the user increases or decreases the number of fixed via points, it takes time and effort to make reprogramming.

Further, each fixed via point has a unique attribute such as "point where a holding motion needs to be performed" or "point where a placing motion needs to be performed". For example, when the via point is changed on the measuring device 100 side, unless the robot controller 6 side follows the change, the holding motion or the like may be performed at an unexpected position, which also makes the program creation difficult.

In order to solve such a problem, in the present example, the position determination processing part 22 is configured to not only determine, based on a result of the measurement made by the measuring part 20 and the holding information stored in the holding information storage part 42a, the holding position, held by the robot hand HND, of the workpiece WK placed in the work space, but also determine the coordinates of the fixed via point having any single attribute among the approach position of the robot hand HND for holding the holding position thus determined, the holding position, and the retreat position after holding. Then, the output part 24 outputs, to the robot controller 6 connected to the robot RBT, the coordinates of the fixed via point determined by the position determination processing part 22 and the attribute information showing the attribute of the fixed via point.

(Details of operation of measuring device 100) Hereinafter, details of operation of the measuring device 100 according to the present example will be described. As shown in FIG. 2, the measuring device 100 includes a user interface creation part 25. The user interface creation part 25 is a part that creates various setting user interfaces of the measuring device 100, a model registration user interface, a window, or the like and causes the display part 3 to display such an interface or window.

Figure 8:
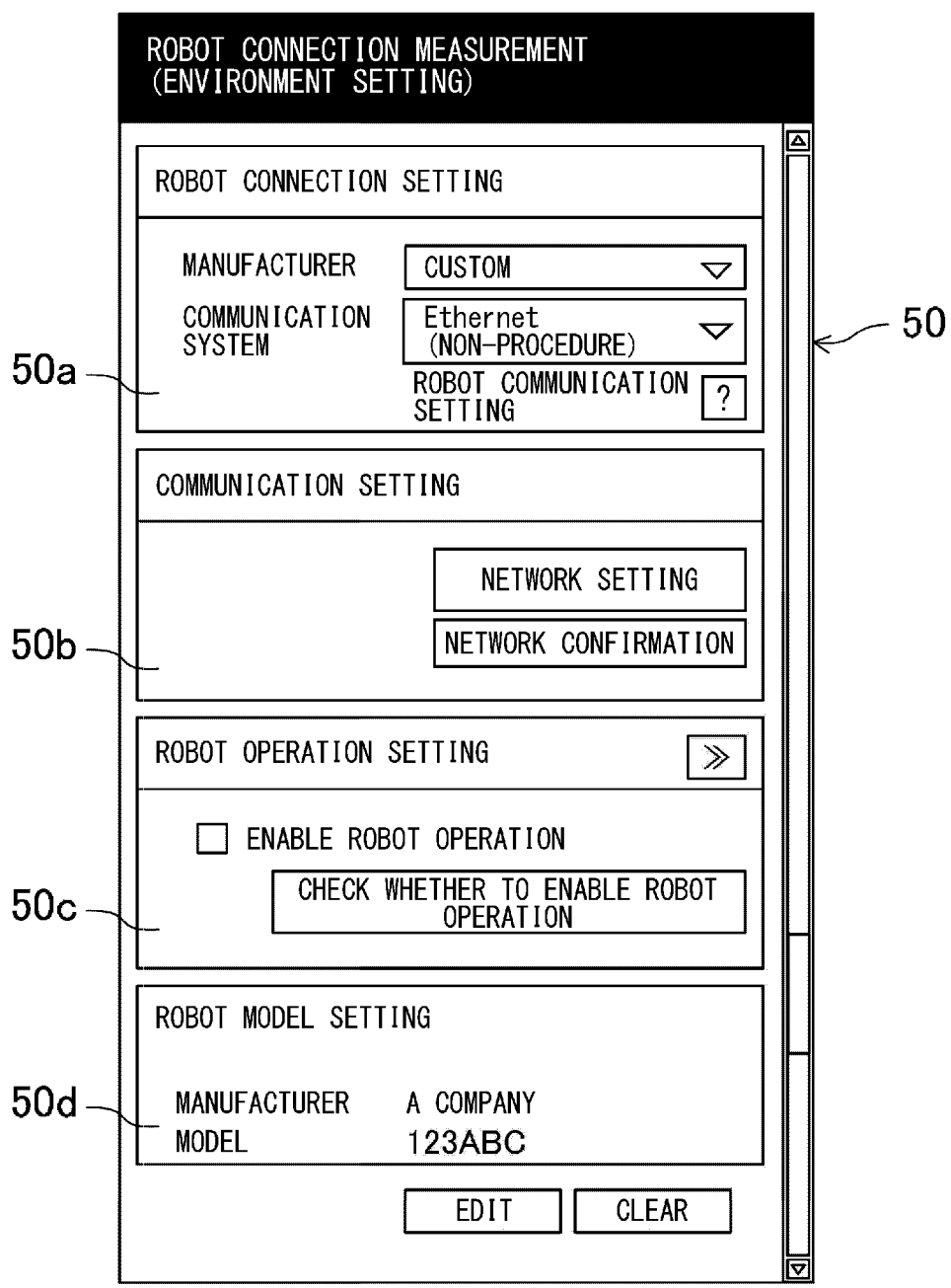
FIG. 8 is a diagram showing an example of a robot connection setting user interface.

FIG. 8 is a diagram showing an example of a robot connection setting user interface 50 created by the user interface creation part 25. The robot connection setting user interface 50 includes a connection setting area 50a for setting a manufacturer and a communication system, a communication setting area 50b for network settings and the like, an operation setting area 50c for determining whether or not to enable the operation of the robot RBT by the measuring device 100, and a model setting area 50d for setting a model of the robot RBT. Each information can be input to a corresponding one of the areas 50a to 50d through the operation of the control panel 4. For example, when the model of the robot RBT is input in the model setting area 50d, connection with the robot controller 6 that controls the robot RBT thus input becomes possible, and various pieces of data of the input robot RBT (the motion range of the arm ARM, and the like) can also be automatically read. Further, the communication system of the measuring device 100 can be automatically changed to a system adapted to the manufacturer. That is, for example, the information on a main robot RBT manufactured by a main manufacturer of the robot RBT and the communication system are prestored in the storage device 42 or the like so as to be read and used by input operation made by the user, which eliminates the need of individually inputting the information on the robot RBT for setting.

Figure 9:
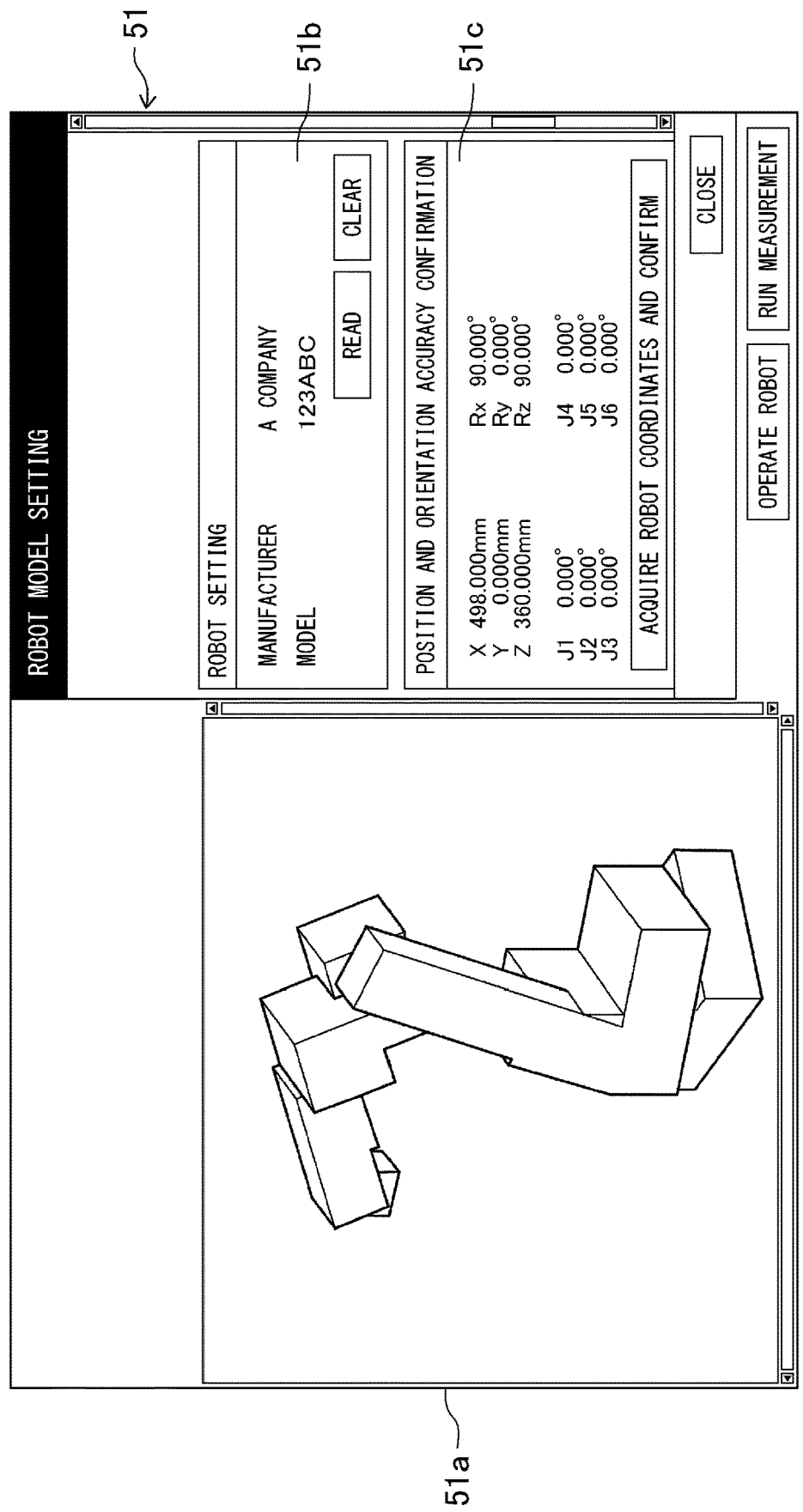
FIG. 9 is a diagram showing an example of a robot model confirmation user interface.

When the input to each of the areas 50a to 50d of the robot connection setting user interface 50 has been finished, the user interface creation part 25 creates a model confirmation user interface 51 shown in FIG. 9 and displays the model confirmation user interface 51 on the display part 3. The model confirmation user interface 51 includes a robot display area 51a where a three-dimensional image showing the robot RBT input in the robot connection setting user interface 50 is displayed, a model display area 51b where the manufacturer and the model are displayed, and an accuracy confirmation area 51c where the accuracy of the position and orientation is confirmed. The user can confirm whether or not the selected robot RBT is correct via the model confirmation user interface 51.

Figure 10:
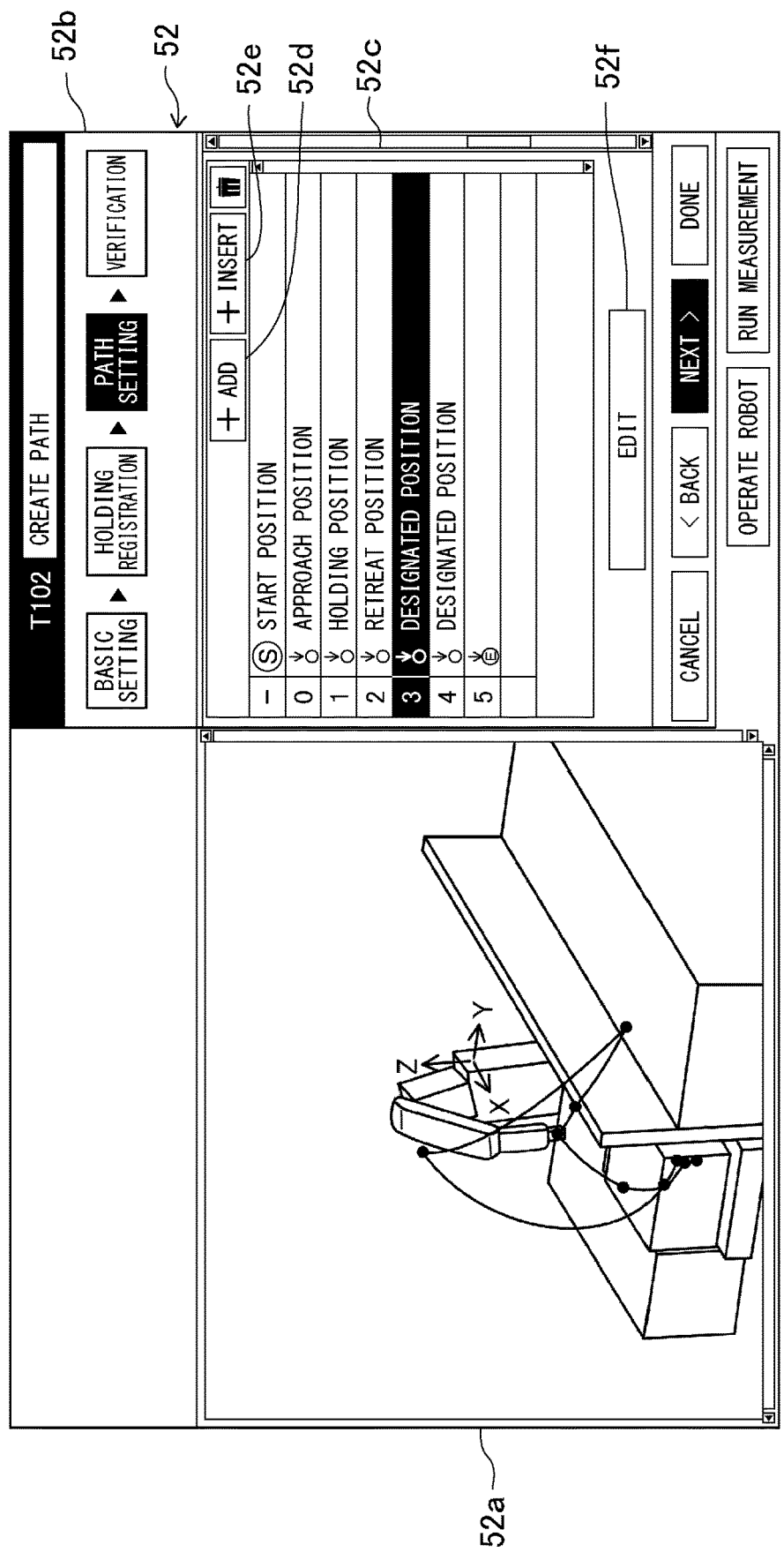
FIG. 10 is a diagram showing an example of a user setting user interface.

(Details of user setting when creating path) FIG. 10 is a diagram showing an example of a user setting user interface 52. The user setting user interface 52 includes a robot display area 52a where a three-dimensional image showing the selected robot RBT is displayed, a selection area 52b where a selection is made from various setting operations, and an order display area 52c where a motion order of the robot hand HND is displayed. In the order display area 52c, fixed via points such as the approach position, the holding position, the retreat position, and the like, and intermediate via points automatically calculated by the path creation part 23 are displayed together with their respective names. Names such as "approach position", "retreat position", "holding position", and "designated position" that are easy for the user to understand may be employed. The via points displayed in the order display area 52c are displayed in the robot display area 52a in a state that makes the relative positional relation with the robot RBT identifiable.

The order display area 52c is configured to display a plurality of fixed via points when the position determination processing part 22 determines the plurality of fixed via points and to display a passing order of the fixed via points. That is, in the order display area 52c, the "start position" that is a position where the robot hand HND starts to move is placed at the top, and a plurality of via points are listed below the "start position" in the passing order. A display mode of the fixed via points and intermediate via points (hereinafter, collectively referred to as via points) is not limited to the mode shown in FIG. 10, and may be, for example, a mode where the fixed via points and intermediate via points are arranged in the order in a left-right direction. A curve or a straight line that complements a section between the fixed via points is a set of intermediate via points, and is therefore synonymous with the intermediate via point.

Figure 11:
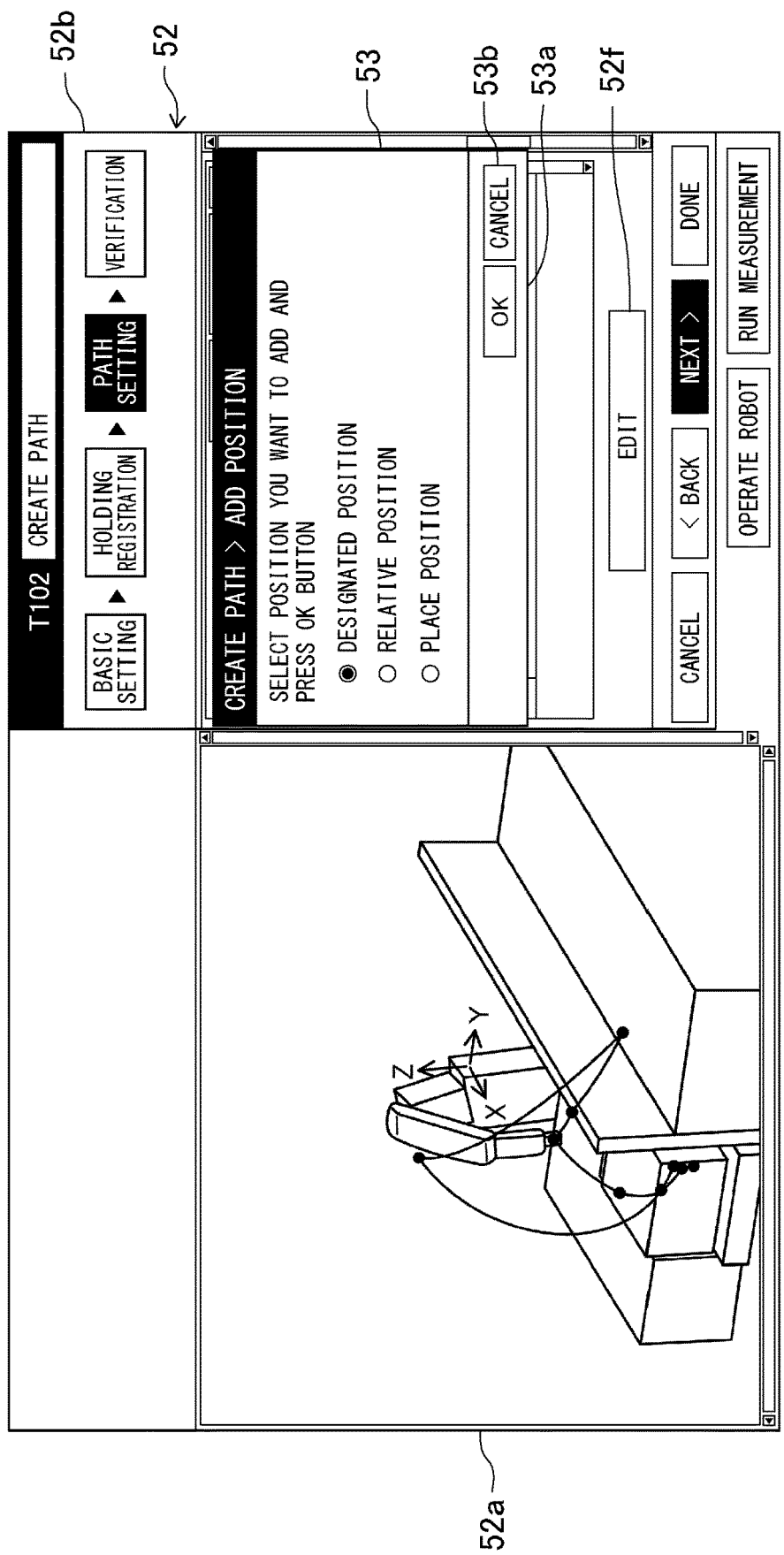
FIG. 11 is a diagram showing an example of an attribute information input window.

The order display area 52c includes an add button 52d to be operated to add a via point and an insert button 52e. An edit button 52f to be operated to edit a via point is further provided in the order display area 52c. When the user operates the add button 52d or the insert button 52e, a via point can be added to or inserted into a desired position. When the via point is added, as shown in FIG. 11, the user interface creation part 25 creates an attribute information input window 53 where the attribute information on the via point is input and superimposes the attribute information input window 53 on the order display area 52c. This attribute information input window 53 allows individual editing of a plurality of fixed via points. Note that an unnecessary fixed via point can be deleted.

The attribute information includes the approach position, holding position, retreat position after holding, place position, relative position, and the like of the robot hand HND. In the attribute information input window 53, any one of the pieces of attribute information is displayed in a selectable manner. That is, one fixed via point can be associated with one piece of attribute information. An input part used to input the attribute information on the via point may be made up of the control panel 4 capable of performing an input operation on the attribute information input window 53.

When an OK button 53a of the attribute information input window 53 is pressed, the selection is applied, and the fixed via point and the attribute information are stored in the storage device 42 in association with each other, and when a cancel button 53*b* is pressed, the selection is discarded. When either the OK button 53*a* or the cancel button 53*b* is pressed, the attribute information input window 53 is closed.

Figure 12:
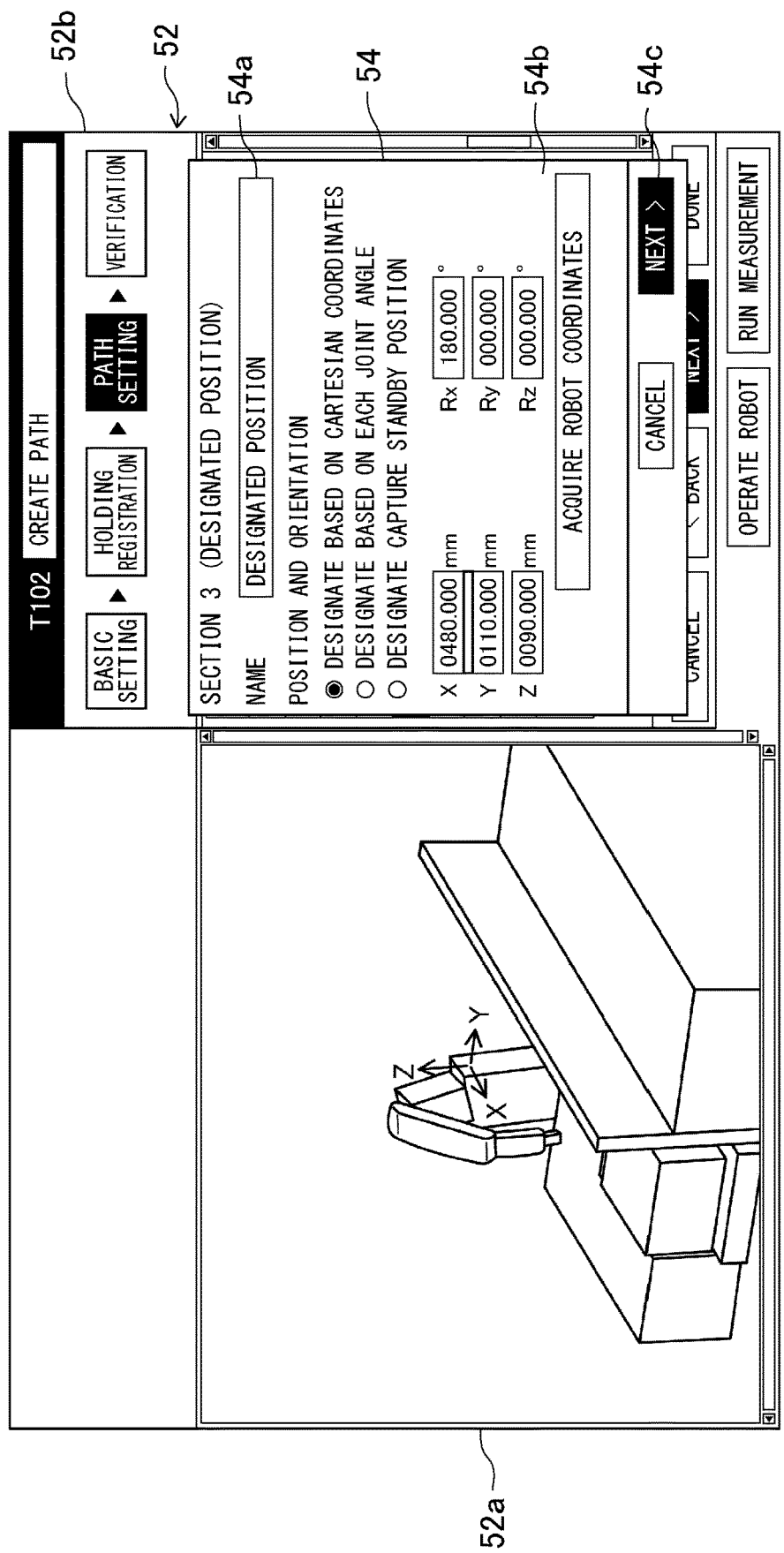
FIG. 12 is a diagram showing an example of a fixed via point position setting window.

When the edit button 52*f* shown in FIG. 10 is pressed, the user interface creation part 25 creates a position setting window 54 shown in FIG. 12 and superimposes the position setting window 54 on the user setting user interface 52. The position setting window 54 includes a name display area 54*a* where a name of a fixed via point to be edited is displayed, and a position and orientation designation area 54*b* where the position of the fixed via point or the orientation of the robot hand HND at the fixed via point is designated. A name displayed in the name display area 54*a* can be changed. Further, in the position and orientation designation area 54*b*, it is possible to select whether to designate the position or orientation in the form of orthogonal coordinates or each joint angle and also to designate a capture standby position. The capture standby position is a position where the robot hand HND can be retreated to a position that falls outside a visual field range of the sensor 2 when the sensor 2 captures an image of the workpiece WK.

Figure 13:
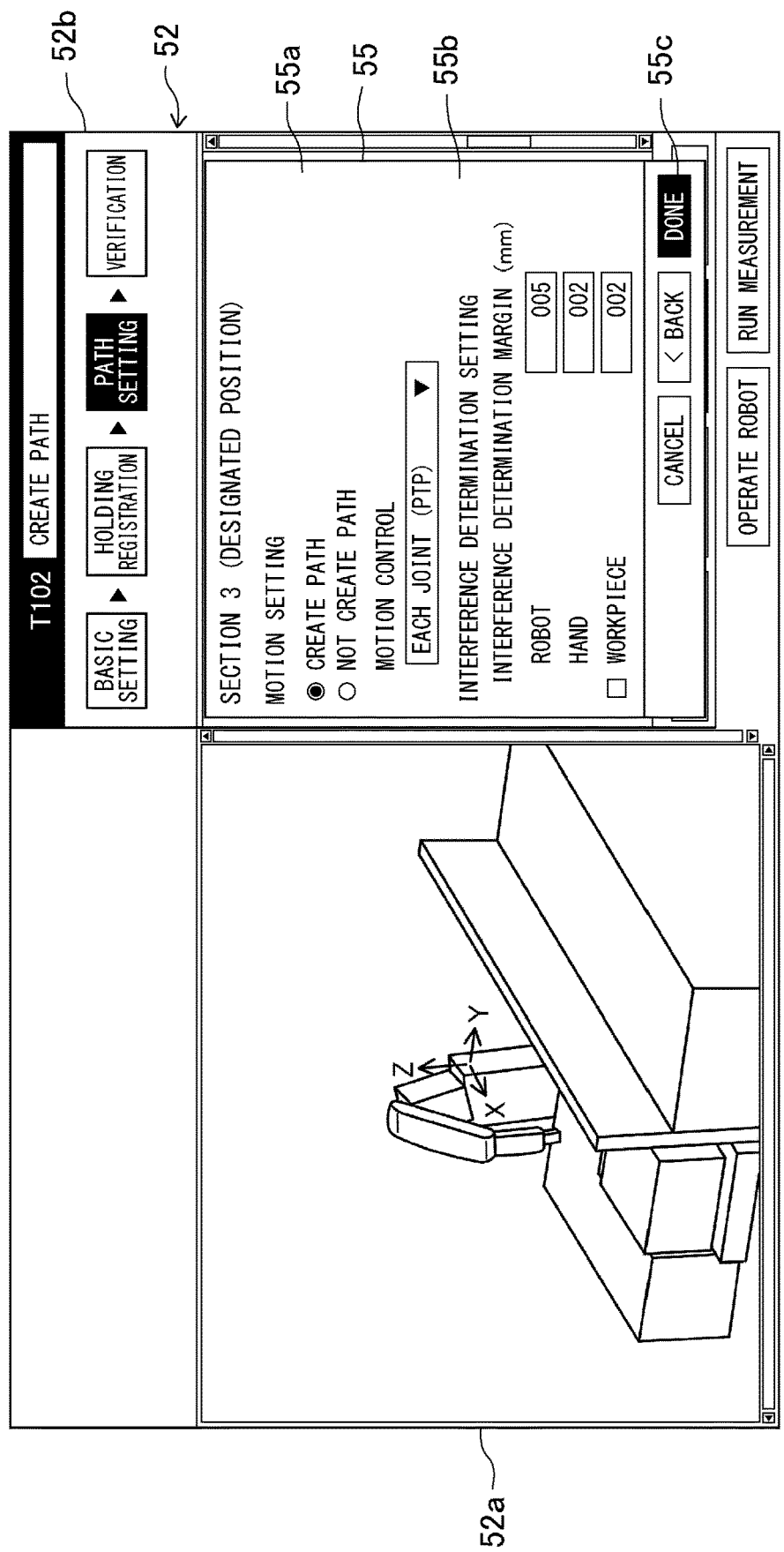
FIG. 13 is a diagram showing an example of a motion/ interference determination setting window.

When a next button 54*c* of the position setting window 54 is operated, the user interface creation part 25 creates a motion/interference determination setting window 55 shown in FIG. 13 and superimposes the motion/interference determination setting window 55 on the user setting user interface 52. The motion/interference determination setting window 55 includes a motion setting area 55*a* and an interference determination setting area 55*b*. In the motion setting area 55*a*, it is possible to select whether or not to create a path passing through a via point.

When no path is created, it is possible to select movement through a joint interpolated motion or movement through a linearly-interpolated motion. The joint interpolated motion is a linear movement in the joint angle space, but is, in the actual three-dimensional space, a startup in a curved line. The linearly-interpolated motion is opposite to the joint interpolated motion. According to the present embodiment, since all the coordinates are internally managed based on the angle of each joint, the linearly-interpolated motion is achieved, in a strict sense, by a set of joint interpolated motions each corresponding to a small section. In this case, a plurality of via points that can be regarded as a sufficient straight line are created (a section between the via points thus created corresponds to joint interpolated movement). Although this is determined at the time of setting, as in the case where the path is created, a via point that the user does not explicitly set can be created. Note that although the interference determination is made even when no path is created, a path that avoids interference cannot be created, and therefore, if interference occurs on the path, the path creation fails as a whole. For example, when a path is created, the path creation part 23 can automatically create a path passing through a via point and display the path in the robot display area 52*a*. When the path is automatically created, an intermediate via point is automatically created.

In the interference determination setting area 55*b*, margin information for use in interference determination can be input numerically (mm). When a distance between the robot hand HND and an obstacle becomes less than the input value, it is determined that the robot hand HND and the obstacle interfere with each other.

Figure 14:
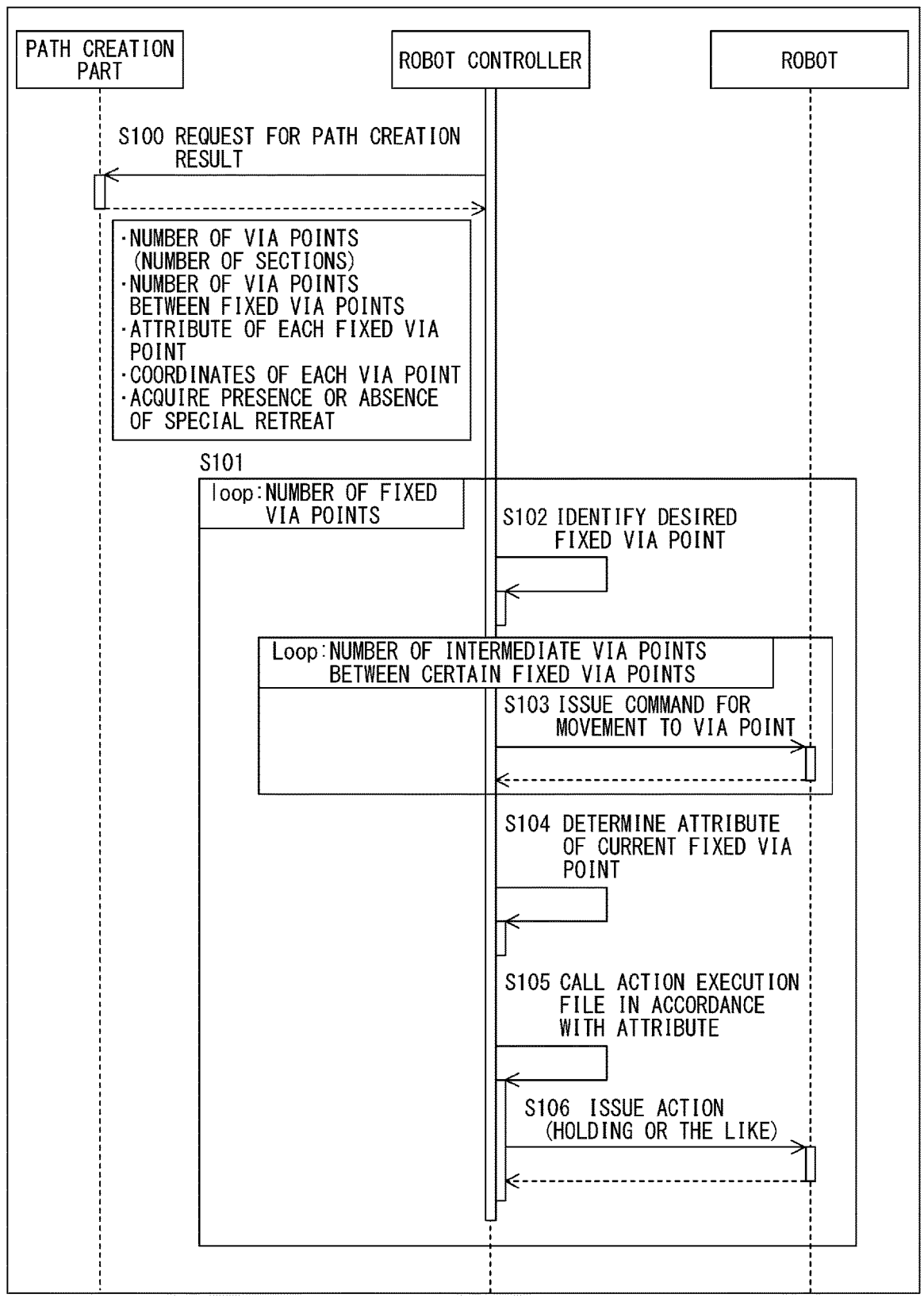
FIG. 14 is a diagram showing a process sequence of a measuring device, a robot controller, and a robot.

FIG. 14 is a diagram showing a process sequence of the measuring device 100, the robot controller 6, and the robot RBT. In S100 in the process sequence diagram, the robot controller 6 issues a request to the path creation part 23 of the measuring device 100 for a path creation result. In response to this request, the path creation part 23 creates a path and causes the output part 24 to output, to the robot controller 6, the number of fixed via points, the number of via points between the fixed via points, the attribute of each fixed via point, the coordinates of each via point, the presence or absence of special retreat, and the like.

Herein, the number of fixed via points can be dynamically changed. For example, as the number of fixed via points on the user setting user interface 52 shown in FIG. 10 increases, the number of fixed via points to be sent to the robot controller 6 increases accordingly, and as the number of fixed via points on the user setting user interface 52 decreases, the number of fixed via points to be sent to the robot controller 6 decreases accordingly. According to the present embodiment, the attribute information on each fixed via point is output, or alternatively, an index of each fixed via point associated with each piece of attribute information may be output.

S101 shown in FIG. 14 is a process that is repeated the number of times equal to the number of fixed via points. In this process, first, in S102, the robot controller 6 identifies a desired fixed via point. Then, in S103, a command for movement to the via point is issued to the robot RBT. In S104, an attribute is determined based on the attribute information associated with the current fixed via point. In S105, an action execution file corresponding to the attribute determined in S104 is called. The action execution file is, for example, holding, place, or the like. Then, in S106, an action is issued to the robot RBT. Then, in S102, another fixed via point is designated. S102 to S106 are repeated the number of times equal to the number of fixed via points, thereby conveying the workpiece WK.

(Robot controller pseudo program) Next, a robot controller pseudo program will be described. The robot controller pseudo program includes a method (first method) in which the measuring device 100 registers the attribute information on the fixed via point in association with the fixed via point and outputs the attribute information, and the robot controller 6 side processes the attribute information, and a method (second method) in which the measuring device 100 side processes the attribute information on the fixed via point to convert the attribute information into a command for the robot RBT, and the robot controller 6 side executes a received command on a one-by-one basis. Hereinafter, specific examples of the first method and the second method will be described.

(Specific example of first method) First, FIG. 15A shows an example of a main program in a case where the attribute information on the fixed via point can be registered in association with the fixed via point on the user interface. In the present example, the measuring part 20 makes a measurement, and, if there is no measurement result, the program is terminated. While if there is a measurement result, the subsequent process is performed. For example, upon receipt of a path creation result, the robot hand HND is moved to a fixed via point or an intermediate via point, the attribute of the current fixed via point is determined, and an action corresponding the attribute is issued. Herein, as shown in FIG. 15B, an action program as another program is called and executed.

On the other hand, a case where the attribute information cannot be associated and registered on the user interface will be described. When via points are set in the order shown in the order display area 52*c* in FIG. 10, a main program as shown in an example in FIG. 16 is created. Fixed via points 1 to 5 of the main program shown in FIG. 16 correspond to the "approach position", the "holding position", the "retreat position", and the two "designated positions" in the order display area 52c shown in FIG. 10, respectively, and an action is issued based on the attribute information on each via point.

Figure 17:
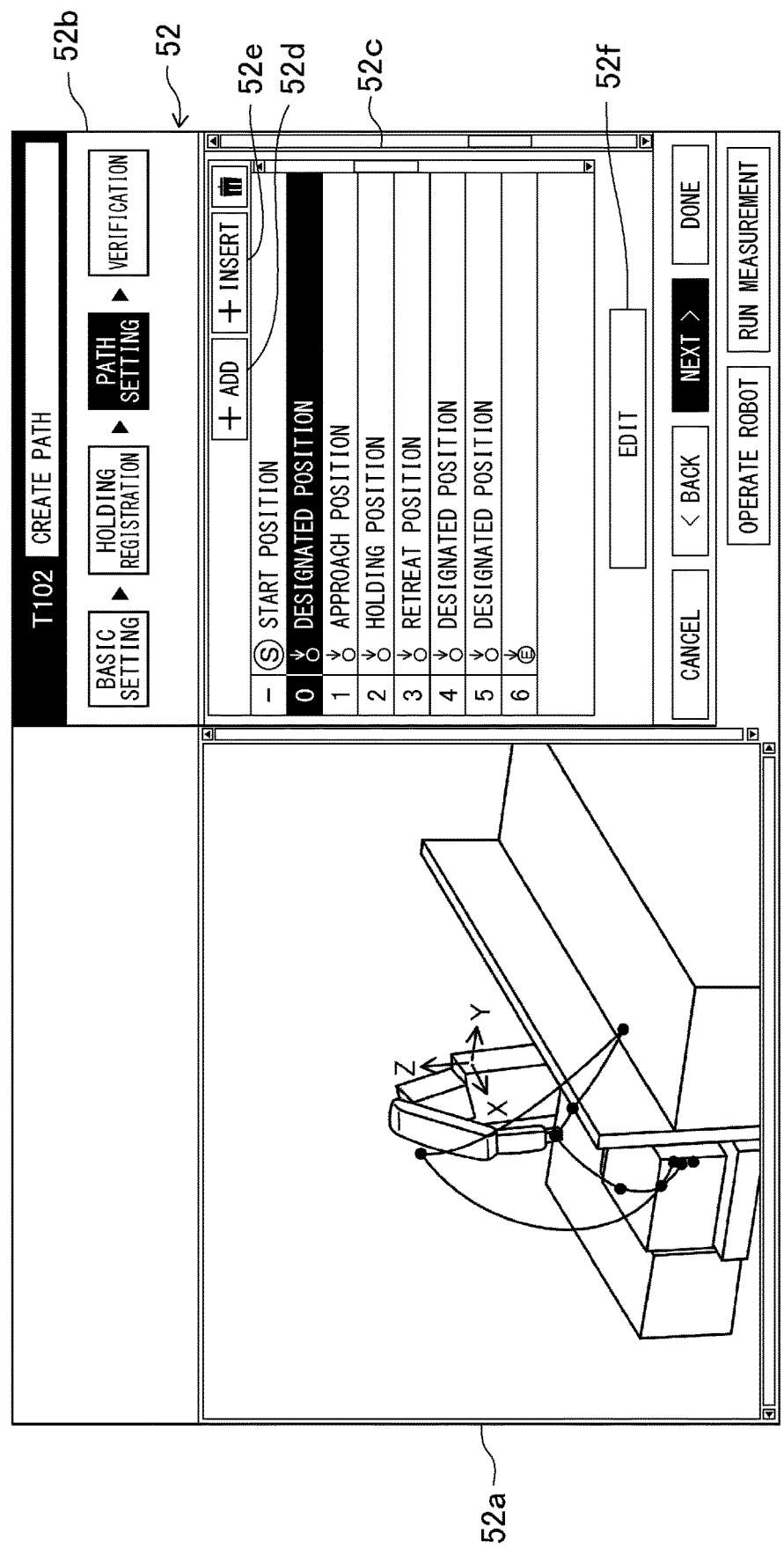
FIG. 17 is a diagram corresponding to FIG. 10 when a fixed via point (designated position) is added before an approach position.

As shown in FIG. 17, a fixed via point (designated position) can be added before the approach position, and in this case, how the main program changes will be described. FIG. 17 shows a case where the "designated position" shown in black is added to the order display area 52c. When the "designated position" is added, the user inputs the attribute information via the attribute information input window 53 shown in FIG. 11, so that the "designated position" thus added has been already associated with the attribute information. In this case, the main program deletes "HAND OPEN" in line 11 and writes "HAND OPEN" in line 16 as shown in FIG. 18. Then, the execution frequency of the process is increased by the number of via points added in line 33. Note that, for the holding position, "HAND CLOSE" is applied.

As described above, in the measuring device 100, the via point and the attribute information can be registered in association with each other and output, and, in the robot controller 6 side, the attribute information associated with the via point is interpreted and processed. In the present example, providing two arrays of via points and attribute information associated with the via points can make the robot program simple. An example of how to hold data in this case is shown in FIG. 19.

(Specific example of second method) Next, a description will be given of the second method in which the attribute information on the fixed via point is processed and converted into a command in the measuring device 100 side, and the command is executed in the robot controller 6 side on a one-by-one basis. In this case, the measuring device 100 sends command information and position information on the via point to the robot controller 6, thereby causing the robot controller 6 to hold data arrays as shown in FIG. 20. In FIG. 20, "via point" means a request to trace a via point, and "hand" means a request to operate the robot hand HND.

The robot controller 6 can determine what to do next with reference to a command array shown in FIG. 20. The main program in this case is shown in FIG. 21, in which a Move command is issued to the robot RBT in line 11, and then a hand action is issued to the robot hand HND in line 13. Further, as shown in FIG. 22, via point data may be included in the command array.

Figure 23:
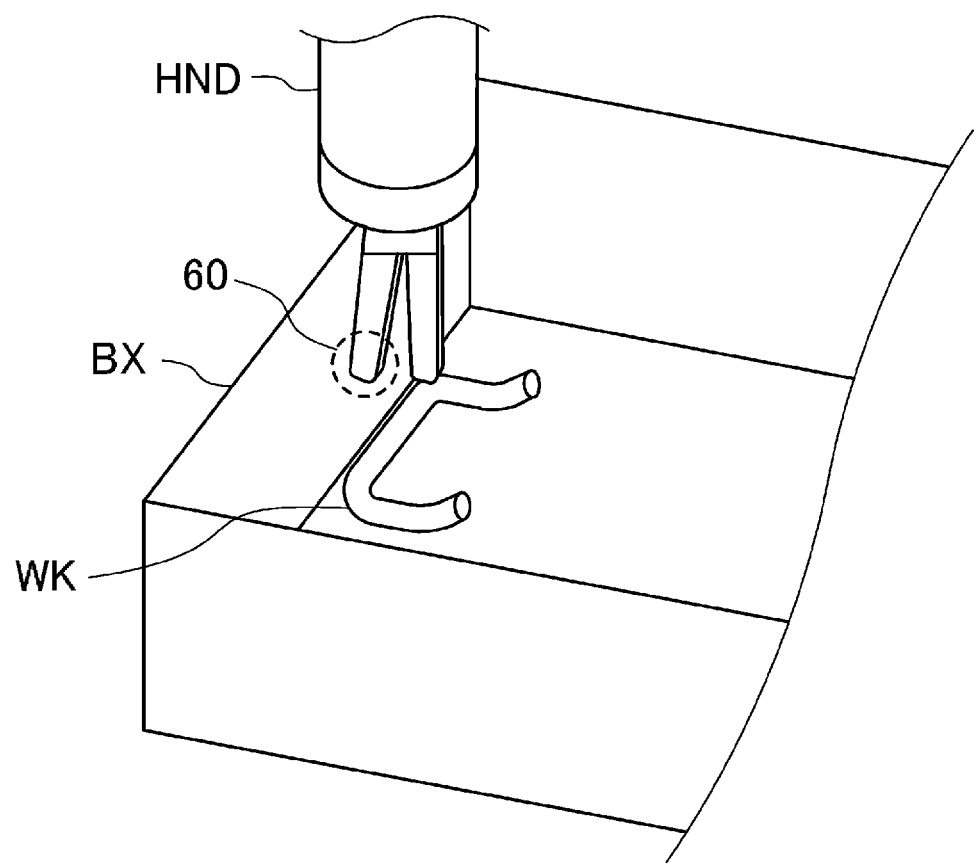
FIG. 23 is a diagram for describing a situation where the robot hand interferes with a wall surface of a container and thus cannot hold a workpiece.

(Special motion function) In the present example, a special motion function that allows the workpiece WK to be pulled or lifted by the robot hand HND is implemented. For example, as shown in FIG. 23, it is assumed that the workpiece WK is placed near a wall surface of the container BX, and the robot hand HND comes into contact with the wall surface of the container BX when trying to cause the robot hand HND to hold the possible holding position and fails to hold the possible holding position. Such a case may occur even when a plurality of possible holding positions are set for each workpiece WK. In the example shown in FIG. 23, the robot hand HND comes into contact with the wall surface of the container BX within a circle denoted by a reference numeral 60. In this case, the robot hand HND holds a holdable part of the workpiece WK and moves the workpiece WK, and then holds a preset possible holding position and conveys the workpiece WK to the place position.

In the related art, the above-described motion is achieved by a branch process in a robot program side executed upon receipt of a flag indicating at which position the workpiece WK is held from a measuring device or the like. However, in order to implement this function, the two controllers of the robot controller 6 and the measuring device, need to be configured, which deteriorates maintainability. The complexity of the robot program contributes to dependency on user's skill.

The special motion function in the present example is different from the control in the related art in that the function can be implemented only via the configuration of the measuring device 100. Hereinafter, a specific description will be given with reference to a user interface.

Figure 24:
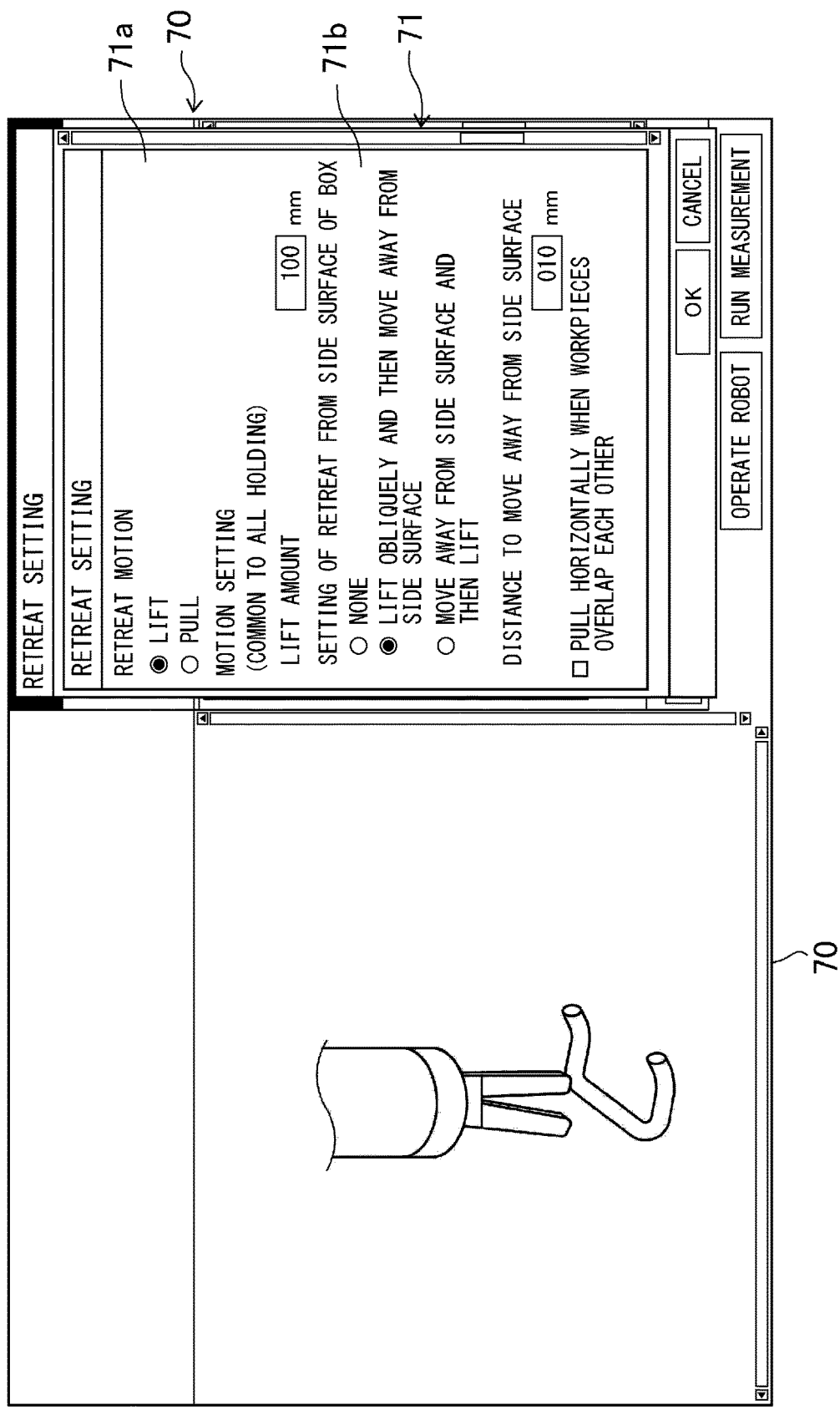
FIG. 24 is a diagram showing an example of a special motion function setting user interface.

FIG. 24 is a diagram showing an example of a special motion function setting user interface 70 that is created by the user interface creation part 25 and is displayed on the display part 3. The special motion function setting user interface 70 includes a display area 70a capable of displaying the robot hand HND and the workpiece WK. On this special motion function setting user interface 70, a retreat setting window 71 is superimposed and displayed as a separate window. The retreat setting window 71 includes a selection area 71a that allows either a motion to lift the workpiece WK or a motion to pull the workpiece WK to be selected as the retreat motion and a motion setting area 71b. In the motion setting area 71b, a height when the workpiece WK is lifted can be set in units of mm. Further, in the motion setting area 71b, as details of the retreat motion, for example, a motion to lift the workpiece WK obliquely and then move the workpiece WK away from an inner wall of the container BX, a motion to move the workpiece WK away from an inner wall of the container BX and then lift the workpiece WK, and the like can be set. Further, it is also possible to set a distance indicating how far away the workpiece WK is distanced from the inner wall of the container BX.

Figure 25:
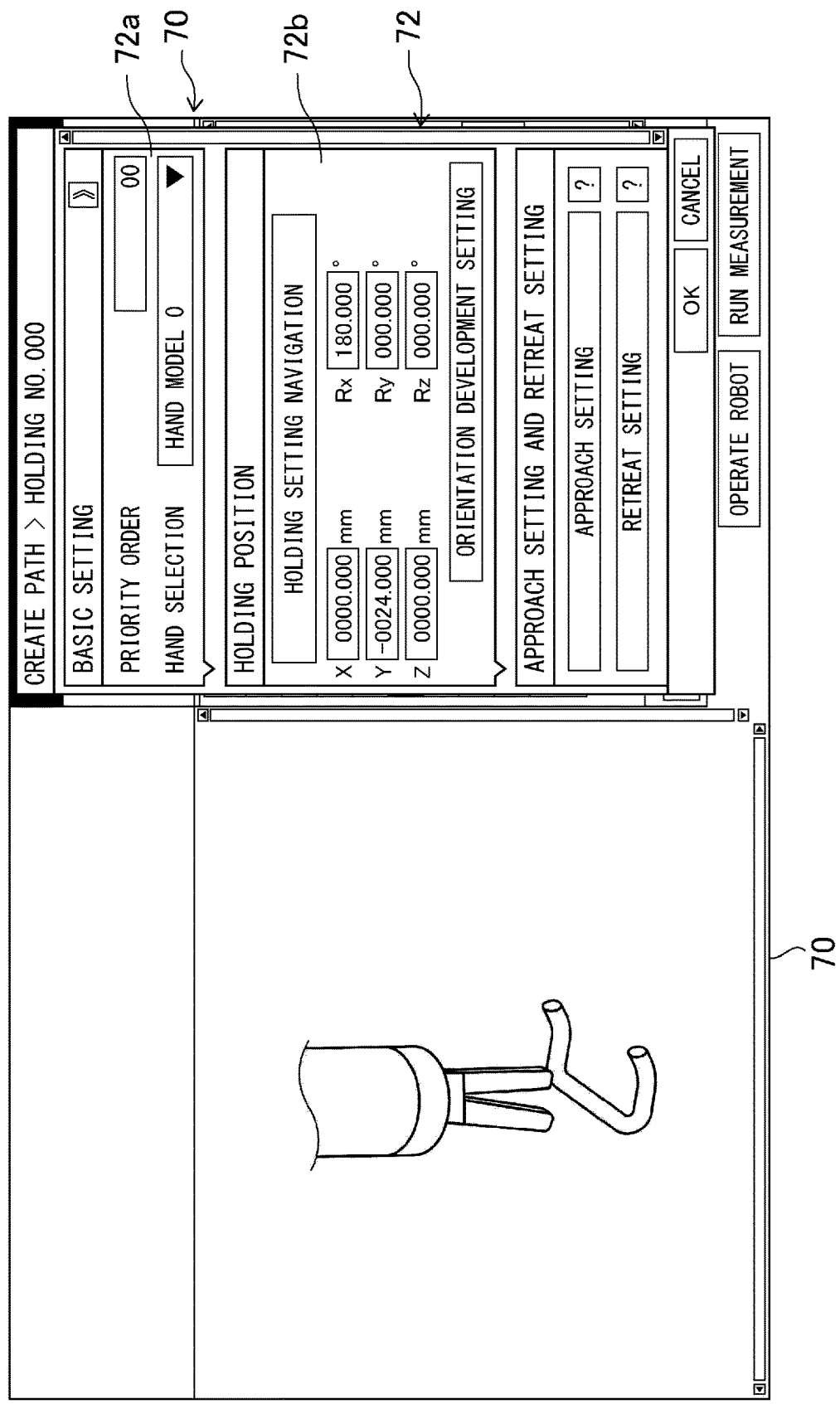
FIG. 25 is a diagram showing an example of an order setting user interface.

Further, as shown in FIG. 25, an order setting user interface 72 may be created by the user interface creation part 25 and displayed on the display part 3. The order setting user interface 72 includes a basic setting area 72a and a holding position setting area 72b. In the basic setting area 72a, it is possible to set the priority of holding during pulling motion lower. The holding position can be set in the holding position setting area 72b.

The pulling motion and the lifting motion are special motions other than the conveyance to the place position. A fixed via point having attribute information on the holding position is allowed to be associated with special motion information that causes the robot hand HND to perform the special motion. For example, when the fixed via point having the attribute information on the holding position is associated with information that causes the pulling motion to be performed, the output part 24 outputs the special motion information to the robot controller 6 when outputting the coordinates of the fixed via point associated with the special motion information. This allows the robot hand HND to perform the pulling motion when the robot hand HND reaches the fixed via point. It is also possible to set a special path such as a path returning to the initial position without moving to the place position when the robot hand HND performs the pulling motion. In this case as well, the robot controller 6 follows the path without user intervention, which reduces the burden on the user. That is, once the setting is made on the measuring device 100 side, the path to be output becomes a path returning to the initial position, so that neither a change nor a branch is required on the robot program side, and only an OPEN/CLOSE command of the robot hand HND needs to be changed on the robot program side for the pulling motion.

(Action and effect of the embodiment) As described above, when the position and orientation of the workpiece WK placed in the work space is measured by the measuring part 20, the holding position of the workpiece WK held by the robot hand HND is determined based on a result of the measurement and prestored holding information showing a possible holding position of the workpiece WK. Further, the coordinates of the fixed via point having any single attribute among the approach position of the robot hand HND for holding the determined holding position, the holding position, and the retreat position after holding are also determined. Since the coordinates of the fixed via point and the attribute information showing the attribute of the fixed via point are output from the measuring device 100 to the robot controller 6, the user only needs to edit path settings of the robot hand HND without consideration of a correspondence relation with the robot controller 6 side and to verify the motion of the robot hand HND without concern for the motion of the robot RBT itself. In other words, the user can create the robot program simply by describing the motion of the robot hand HND in accordance with each attribute information.

The above-described embodiments are merely examples in all respects, and should not be construed as limiting. Further, all modifications and changes within the equivalent range of the claims fall within the scope of the present invention.

As described above, the measuring device according to the present invention is applicable to, for example, a case where a workpiece placed in a work space is measured, and a robot that conveys the workpiece is controlled.

What is claimed is:

1. A measuring device that measures a workpiece placed in a work space and controls a robot that conveys the workpiece, the measuring device comprising:
    a measuring part that measures a position and orientation of the workpiece placed in the work space;
    a holding information storage part that stores holding information showing a possible holding position of the workpiece held by a robot hand of the robot;
    a position determination processing part that determines a holding position, held by the robot hand, of the workpiece placed in the work space and determines coordinates of each of a plurality of fixed via points having any single attribute based on a result of measurement made by the measuring part and the holding information stored in the holding information storage part, one of the plurality of fixed via points being one of an approach position of the robot hand for holding the holding position, the holding position, and a retreat position after holding;
    a user interface creation part that creates a user interface that includes (1) an order display area showing a passing order of the plurality of fixed via points and (2) a robot display area, different from the order display area, showing the robot hand;
    an output part that outputs, to a robot controller connected to the robot, the coordinates of each of the plurality of fixed via points determined by the position determination processing part, attribute information showing the attribute of each of the plurality of fixed via points, and information regarding the passing order of the plurality of fixed via points; and
    an input part that receives a new fixed via point added or inserted and new attribute information showing an attribute of the new fixed via point on the user interface, wherein
    when the input part receives the new fixed via point and the new attribute information, (i) the user interface creation part creates the order display area showing a new passing order of a new plurality of fixed via points including the new fixed via point, and (ii) the output part outputs, to the robot controller, (a) coordinates of each of the new plurality of fixed via points determined by the position determination processing part, (b) the new attribute information of each of the new plurality of the fixed via points, and (c) information regarding the new passing order of the new plurality of fixed via points.

2. The measuring device according to claim 1, wherein the user interface creation part creates the user interface that allows individual editing of the plurality of fixed via points; and
    a display part that displays the user interface created by the user interface creation part.

3. The measuring device according to claim 2, wherein the input part is capable of changing a position or an orientation of the robot hand as the individual editing of the fixed via point.

4. The measuring device according to claim 3, wherein the input part is capable of designating the position or the orientation of the robot hand in a form of orthogonal coordinates or each joint angle as the individual editing of the fixed via point.

5. The measuring device according to claim 1, wherein the input part is capable of adding a designated position designated by a user as a fixed via point.

6. The measuring device according to claim 1, wherein the input part is capable of adding a place position of the workpiece as a fixed via point.

7. The measuring device according to claim 1, wherein the output part is configured to output, to the robot controller, a number of the plurality of fixed via points determined by the position determination processing part, a number of intermediate via points between the plurality of fixed via points, coordinates of each of the plurality of fixed via points, and coordinates of each of the intermediate via points.

8. The measuring device according to claim 1, wherein one of the plurality of fixed via points having attribute information on a holding position is allowed to be associated with special motion information that causes the robot hand to perform a special motion other than conveyance to a place position, and
    the output part is configured to output the special motion information to the robot controller when outputting coordinates of one of the plurality of the fixed via points associated with the special motion information.

9. The measuring device according to claim 8, wherein the input part is capable of selecting a pulling motion to pull the workpiece or a lifting motion to lift the workpiece by the robot hand as the special motion.

10. The measuring device according to claim 9, wherein when the pulling motion is selected, the input part is capable of further selecting (1) a motion to lift the workpiece obliquely and the move the workpiece away from an object surrounding the workpiece or (2) a motion to move the workpiece away from the object surrounding the workpiece and then lift the workpiece.

11. The measuring device according to claim 10, wherein the input part is capable of setting a height when the workpiece is lifted or a distance indicating how far away the workpiece is distanced from the object surrounding the workpiece.

12. A measuring device that measures a workpiece placed in a work space and controls a robot that conveys the workpiece, the measuring device comprising:
- a measuring part that measures a position and orientation of the workpiece placed in the work space;
- a holding information storage part that stores holding information showing a possible holding position of the workpiece held by a robot hand of the robot;
- a position determination processing part that determines a holding position, held by the robot hand, of the workpiece placed in the work space and determines coordinates of each of a plurality of fixed via points having any single attribute based on a result of measurement made by the measuring part and the holding information stored in the holding information storage part, one of the plurality of fixed via points being one of an approach position of the robot hand for holding the holding position, the holding position, and a retreat position after holding, and processes the attribute information showing the attribute of each of the plurality of fixed via points to convert the attribute information into a command;
- a user interface creation part that creates a user interface that includes (1) an order display area showing a passing order of a plurality of fixed via points and (2) a robot display area, different from the order display area, showing the robot hand;
- an output part that outputs, to a robot controller connected to the robot, the command obtained by the position determination processing part, and information regarding the passing order of the plurality of fixed via points; and
- an input part that receives a new fixed via point added or inserted and new attribute information showing an attribute of the new fixed via point on the user interface, wherein when the input part receives the new fixed via point and the new attribute information, (i) the user interface creation part creates the order display area showing a new passing order of a new plurality of fixed via points including the new fixed via point, and (ii) the output part outputs, to the robot controller, new commands of the new plurality of fixed via points obtained by the position determination processing part, and information regarding the new passing order of the new plurality of fixed via points.

13. The measuring device according to claim 12, wherein
one of the plurality of fixed via points having attribute information on a holding position is allowed to be associated with special motion information that causes the robot hand to perform a special motion other than conveyance to a place position, and
the output part is configured to output the special motion information to the robot controller when outputting coordinates of one of the plurality of fixed via points associated with the special motion information.

14. The measuring device according to claim 13, wherein the input part is capable of selecting a pulling motion to pull the workpiece or a lifting motion to lift the workpiece by the robot hand as the special motion.

15. The measuring device according to claim 14, wherein when the pulling motion is selected, the input part is capable of further selecting (1) a motion to lift the workpiece obliquely and the move the workpiece away from an object surrounding the workpiece or (2) a motion to move the workpiece away from the object surrounding the workpiece and then lift the workpiece.

16. The measuring device according to claim 15, wherein the input part is capable of setting a height when the workpiece is lifted or a distance indicating how far away the workpiece is distanced from the object surrounding the workpiece.

\* \* \* \* \*